(12) United States Patent
Xu et al.

(10) Patent No.: US 11,900,612 B2
(45) Date of Patent: Feb. 13, 2024

(54) THREE-DIMENSIONAL ELEMENT LAYOUT VISUALIZATION METHOD AND APPARATUS

(71) Applicant: SHENZHEN UNIVERSITY, Guangdong (CN)

(72) Inventors: Pengfei Xu, Shenzhen (CN); Guohang Yan, Shenzhen (CN); Hui Huang, Shenzhen (CN)

(73) Assignee: Shenzhen University, Shenzhen (CN)

(*) Notice: Subject to any disclaimer, the term of this patent is extended or adjusted under 35 U.S.C. 154(b) by 209 days.

(21) Appl. No.: 17/612,379

(22) PCT Filed: Jun. 14, 2019

(86) PCT No.: PCT/CN2019/091285
§ 371 (c)(1),
(2) Date: Nov. 18, 2021

(87) PCT Pub. No.: WO2020/237740
PCT Pub. Date: Dec. 3, 2020

(65) Prior Publication Data
US 2022/0245826 A1    Aug. 4, 2022

(30) Foreign Application Priority Data

May 24, 2019   (CN) .......................... 201910441657.4

(51) Int. Cl.
*G06T 7/13*       (2017.01)
*G06T 19/20*      (2011.01)

(52) U.S. Cl.
CPC ................ *G06T 7/13* (2017.01); *G06T 19/20* (2013.01); *G06T 2219/2004* (2013.01)

(58) Field of Classification Search
CPC ..... G06T 7/13; G06T 19/20; G06T 2219/2004
See application file for complete search history.

(56) References Cited

U.S. PATENT DOCUMENTS

| 10,539,787 B2 | 1/2020 | Haddick et al. |
| 2004/0201587 A1 | 10/2004 | Mizusawa |

(Continued)

FOREIGN PATENT DOCUMENTS

| CN | 101042775 A | 9/2007 |
| CN | 101635051 A | 1/2010 |

(Continued)

OTHER PUBLICATIONS

Berretti et al., "Modeling Spatial Relationships between 3D Objects", University of Firenze, Firenze, Italy, 2006, IEEE (4 pages).

(Continued)

*Primary Examiner* — YuJang Tswei
(74) *Attorney, Agent, or Firm* — Polsinelli PC

(57) ABSTRACT

The present disclosure provides a three-dimensional element layout visualization method and apparatus. The three-dimensional element layout visualization method includes: determining a bounding box of each three-dimensional element in a visualization interface; projecting the bounding box of each three-dimensional element in a target projection direction to obtain edge elements of the bounding box of each three-dimensional element in the visualization interface; and determining, according to positions of the edge elements in the visualization interface, at least one edge element set satisfying a first preset condition, and displaying a collinearity identification corresponding to the edge element set in the visualization interface.

10 Claims, 15 Drawing Sheets

(56) References Cited

U.S. PATENT DOCUMENTS

| | | | |
|---|---|---|---|
| 2005/0063582 A1* | 3/2005 | Park | G06T 17/10 |
| | | | 382/181 |
| 2008/0316204 A1 | 12/2008 | Deslandes | |
| 2009/0285460 A1* | 11/2009 | Ishikawa | G06T 3/00 |
| | | | 382/128 |
| 2011/0087350 A1* | 4/2011 | Fogel | G06T 19/00 |
| | | | 700/98 |
| 2014/0192050 A1* | 7/2014 | Qiu | G06V 20/653 |
| | | | 345/420 |
| 2016/0171765 A1* | 6/2016 | Mehr | G06T 17/20 |
| | | | 345/419 |
| 2016/0275209 A1* | 9/2016 | Kelly | G06F 30/00 |
| 2019/0102865 A1* | 4/2019 | Hensley | G06F 3/013 |

FOREIGN PATENT DOCUMENTS

| | | |
|---|---|---|
| CN | 102662292 A | 9/2012 |
| CN | 103230283 A | 8/2013 |
| CN | 104915053 A | 9/2015 |
| CN | 105809735 A | 7/2016 |
| CN | 106710005 A | 5/2017 |

OTHER PUBLICATIONS

Fang, "3D Space Controller and Its Application in 3D Space Interaction Technology", (State Key Laboratory of CAD & CG, Zhejiang University, Hangzhou 310027), (State Key Laboratory of Industrial Psychology, Department of Electronic Engineering, Hangzhou University, Hangzhou 310028), J. CAD & CG, vol. 10, No. 2, Mar. 1998, (pp. 105-111), w/English Abstract.

International Search Report dated Feb. 26, 2020 issued in corresponding Parent Application No. PCT/CN2019/091285 (4 pages).

Chinese Office Action dated May 28, 2020 issued in corresponding Patent Application No. 201910441657.4 (7 pages).

* cited by examiner

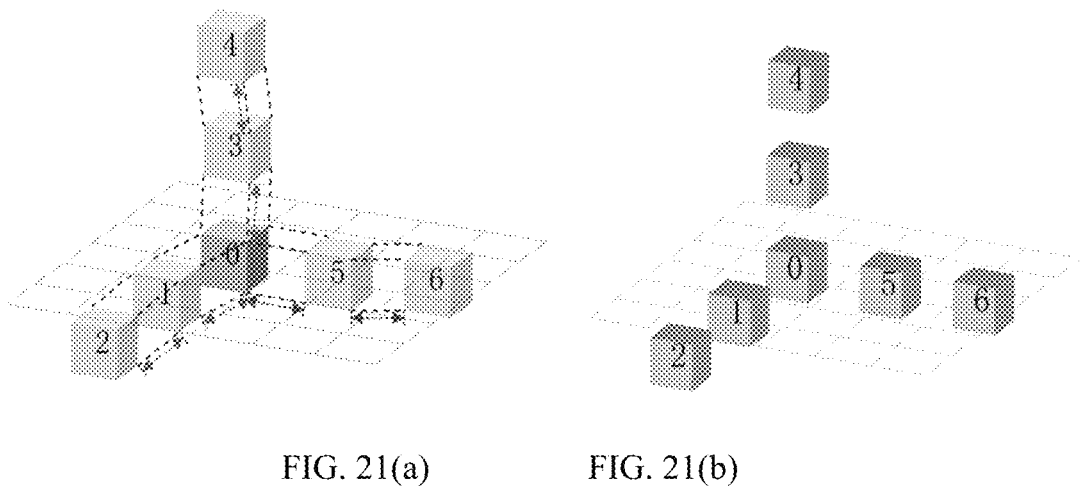

FIG. 21(a)　　　FIG. 21(b)

| Determine, according to a distance between two edge elements in an edge element pair of the edge element set, at least one edge element pair set satisfying a second preset condition, the edge element pair being a pair of edge elements composed of adjacent edge elements; the second preset condition including a distance difference being less than a difference threshold | S701 |

↓

| Display an equidistance identification corresponding to the edge element pair set in the visualization interface, the equidistance identification being configured to represent that distances between edge element pairs in a same edge element pair set are equal | S702 |

FIG. 22

THREE-DIMENSIONAL ELEMENT LAYOUT VISUALIZATION METHOD AND APPARATUS

CROSS-REFERENCE TO RELATED APPLICATIONS

This application is a National Phase of International Application No. PCT/CN2019/091285, filed Jun. 14, 2021 which claims priority to Chinese Patent Application No. 2019104416574, filed with the Chinese Patent Office on May 24, 2019 and entitled "THREE-DIMENSIONAL ELEMENT LAYOUT VISUALIZATION METHOD AND APPARATUS", the entire contents of which are all incorporated herein by reference.

TECHNICAL FIELD

The present disclosure relates to the field of computer graphics technologies, more particularly, to a three-dimensional element layout visualization method and apparatus.

BACKGROUND

A three-dimensional modeling system is one of the most valuable applications in the field of computer graphics. After a long time of development, its functions have been very rich and powerful and have been widely used in lots of fields. Currently, dominant three-dimensional modeling systems include 3DMAX, Microsoft Visio, Indesign, and the like. In a three-dimensional modeling system, due to depth information of three-dimensional elements, users often experience perceptual bias when operating the three-dimensional elements. Based on the problem that the users cannot confirm spatial positions of the three-dimensional elements, current mainstream three-dimensional modeling software mainly relies on a multi-view two-dimensional layout visualization method to help the users in determining the spatial positions of the three-dimensional elements, which is specifically as shown in FIG. 1: as can be seen from the right view, a three-dimensional element 0 is located on a left side of a three-dimensional element 5 and is not at a same height as the three-dimensional element 5; as can be seen from the front view, the three-dimensional element 0 is located between three-dimensional elements 2 and 3 and is at a height position lower than height positions of the three-dimensional elements 2 and 3; and as can be seen from the top view, the three-dimensional element 0 is located in front of three-dimensional elements 1-5 and at a distance from a three-dimensional element row formed by the three-dimensional elements 1-5. Therefore, it can be determined from FIG. 1 that the three-dimensional element 0 is specifically located in front of the three-dimensional elements 1-5 and has a height lower than the three-dimensional elements 1-5. However, the multi-view two-dimensional layout visualization method has poor intelligence since the user is required to combine relative positions in a plurality of two-dimensional graphs to determine spatial positions of three-dimensional elements.

SUMMARY

In view of the above, there is a need to provide a three-dimensional element layout visualization method and apparatus with respect to the problem of poor intelligence in determination of spatial positions of three-dimensional elements.

In a first aspect, embodiments of the present disclosure provide a three-dimensional element layout visualization method, including: determining a bounding box of each three-dimensional element in a visualization interface, the bounding box of each three-dimensional element being a frame of a preset shape in the visualization interface and capable of accommodating each three-dimensional element, and the frame of the preset shape being a frame with a regular shape and straight edges; projecting the bounding box of each three-dimensional element in a target projection direction to obtain edge elements of the bounding box of each three-dimensional element in the visualization interface; and determining, according to positions of the edge elements in the visualization interface, at least one edge element set satisfying a first preset condition, and displaying a collinearity identification corresponding to the edge element set in the visualization interface, the collinearity identification being configured to represent that edge elements in a same edge element set are collinear, and the first preset condition including belonging to different three-dimensional elements and a distance from a corresponding fitting line being less than a distance threshold.

In a second aspect, the embodiments of the present disclosure provide a three-dimensional element layout visualization apparatus, including: a bounding box determination module configured to determine a bounding box of each three-dimensional element in a visualization interface, the bounding box of each three-dimensional element being a frame of a preset shape in the visualization interface and capable of accommodating each three-dimensional element, and the frame of the preset shape being a frame with a regular shape and straight edges; an edge element determination module configured to project the bounding box of each three-dimensional element in a target projection direction to obtain edge elements of the bounding box of each three-dimensional element in the visualization interface; and a collinearity identification determination module configured to determine, according to positions of the edge elements in the visualization interface, at least one edge element set satisfying a first preset condition, and display a collinearity identification corresponding to the edge element set in the visualization interface, the collinearity identification being configured to represent that edge elements in a same edge element set are collinear, and the first preset condition including belonging to different three-dimensional elements and a distance from a corresponding fitting line being less than a distance threshold.

In a third aspect, the embodiments of the present disclosure provide a computer device, including a memory and a processor, the memory storing a computer program, and the three-dimensional element layout visualization method described in the first aspect being implemented when the processor executes the computer program. In a fourth aspect, the embodiments of the present disclosure provide a computer-readable storage medium, having a computer program stored thereon, the computer program, when executed by a processor, implementing the three-dimensional element layout visualization method described in the first aspect.

In the three-dimensional element layout visualization method and apparatus according to the above embodiments, a bounding box of a three-dimensional element is projected in a visualization interface according to a target projection direction, so that edge elements corresponding to the three-dimensional element can be displayed in a projection view, and the edge elements with a distance to a fitting line less than a distance threshold can be filtered, according to positions of the edge elements in the visualization interface, to form at least one edge element set. The edge elements in a same edge element set belong to different three-dimensional elements, and the edge elements belonging to the same edge element set are on a same straight line. Therefore, a collinearity identification is displayed between the edge elements on the projection view, so that the user can determine a spatial position relationship between the three-dimensional elements corresponding to the edge elements according to a position relationship between the edge elements in the projection view, which improves intelligence compared with the prior art in which the user is required to combine relative positions in a plurality of two-dimensional graphs to determine spatial positions of three-dimensional elements.

BRIEF DESCRIPTION OF THE DRAWINGS

FIG. 21(a) to FIG. 21(b) are schematic diagrams of comparison prior to optimization and after optimization displayed on the visualization interface;

FIG. 22 is a flowchart of a three-dimensional element layout visualization method according to an embodiment;

DETAILED DESCRIPTION OF THE EMBODIMENTS

In order to make the objectives, technical solutions and advantages of the present disclosure clearer, the present disclosure is described in further detail below with reference to the accompanying drawings and embodiments. It should be understood that specific embodiments described herein are intended only to interpret the present disclosure and not intended to limit the present disclosure. It is to be noted that terms such as "first", "second", "third" and "fourth" in the specification, the claims and the accompanying drawings of the present disclosure are only to distinguish similar objects, but are not intended to describe a specific sequence or precedence order. It is to be understood that data used in this manner may be interchangeable where appropriate, so that the embodiments of the present disclosure described herein may be realized in sequences excluding those illustrated or described herein.

Figure 1:
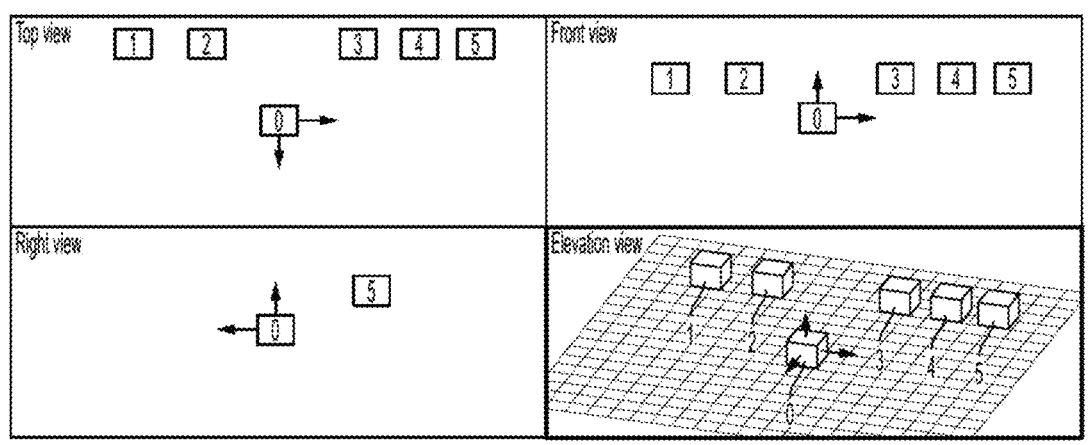
FIG. 1 is a schematic diagram of determination of spatial positions of three-dimensional elements in the prior art.
Figure 2:
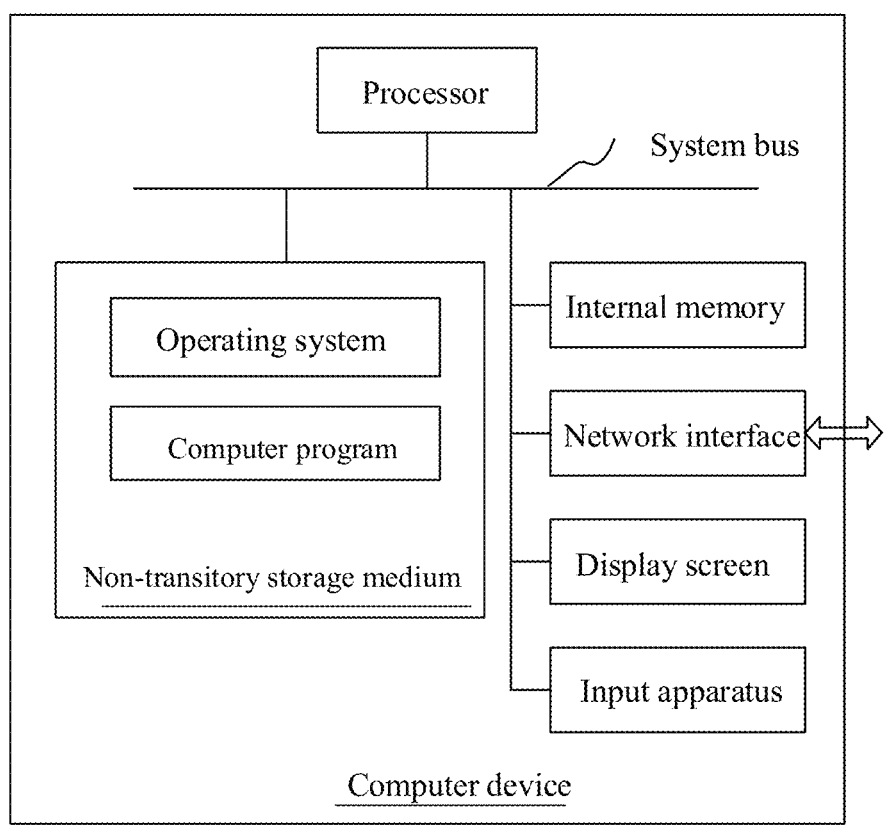
FIG. 2 is a schematic diagram of an internal structure of a computer device according to an embodiment.

A three-dimensional element layout visualization method according to an embodiment of the present disclosure can be applied to a computer device shown in FIG. 2. The computer device may be a terminal. In an example where the computer device is a terminal, its internal structure is shown in FIG. 2. The computer device includes a processor, a memory, a network interface, a display screen and an input apparatus that are connected through a system bus. The processor of the computer device is configured to provide computing and control capabilities. The memory of the computer device includes a non-transitory storage medium and an internal memory. The non-transitory storage medium stores an operating system and a computer program. The internal memory provides an environment for running of the operating system and the computer program in the non-transitory storage medium. The network interface of the computer device is configured to communicate with an external terminal through a network connection. The computer program implements a three-dimensional element layout visualization method when executed by the processor. The computer device may a liquid crystal display screen or an electronic ink display screen. The input apparatus of the computer device may be a touch layer covering the display screen, or may be a key, a trackball, or a touchpad disposed on a housing of the computer device, or may be an external keyboard, a touchpad, a mouse, or the like. Those skilled in the art may understand that a structure shown in FIG. 2 is only a block diagram of some structures related to the solution of the present disclosure and constitutes no limitation on the computer device to which the solution of the present disclosure is applied. Specifically, the computer device may include more or fewer components than those shown in the drawings, or some components may be combined, or a different component deployment may be used.

Due to depth information of three-dimensional elements, users often experience perceptual bias when operating the three-dimensional elements. Currently, during application of three-dimensional modeling software, the users mainly determine spatial positions of the three-dimensional elements by combining relative positions in a plurality of two-dimensional graphs, which has poor intelligence. The technical solution of the present disclosure and how the technical solution of the present disclosure solves the above technical problem are described in detail below through embodiments and with reference to the accompanying drawings. The following specific embodiments may be combined with each other, and a same or similar concept or process may not be described repeatedly in some embodiments.

Figure 3:
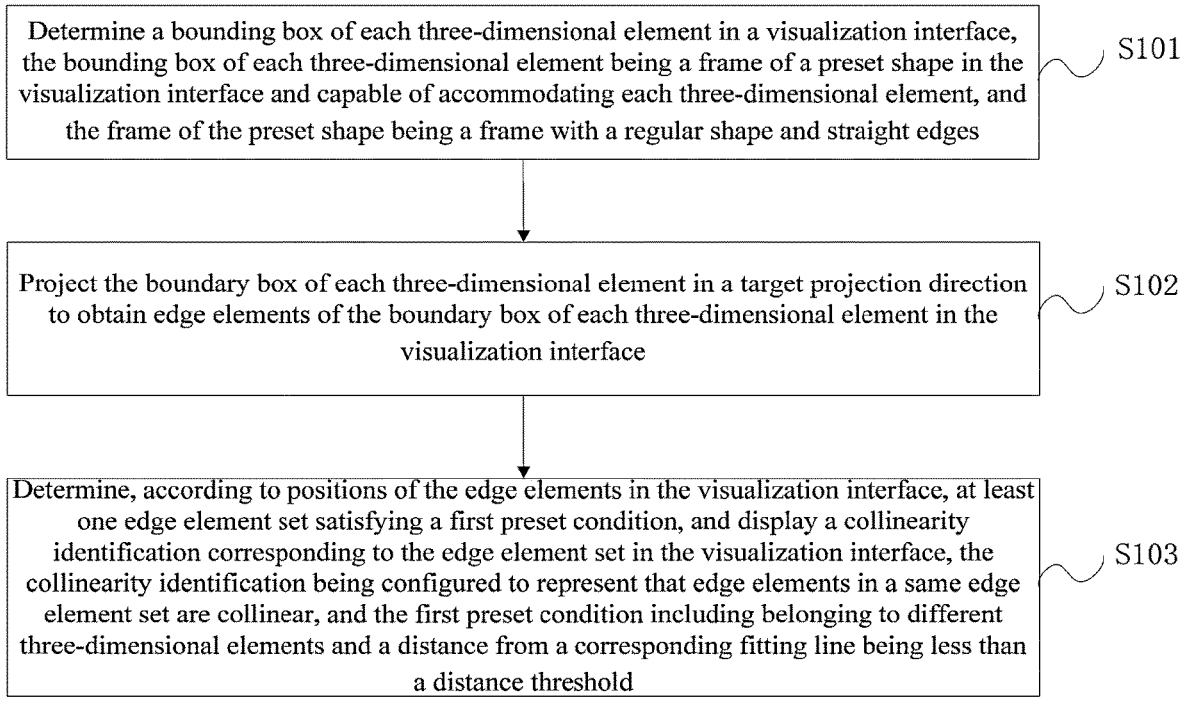
FIG. 3 is a flowchart of a three-dimensional element layout visualization method according to an embodiment.

FIG. 3 is a flowchart of a three-dimensional element layout visualization method according to an embodiment. The method is performed by the computer device in FIG. 2. The method relates to a specific process in which the computer device obtains, according to projection of a bounding box of a three-dimensional element, a projection view where two-dimensional edge elements are presented, displays a collinearity identification in the projection view according to a position relationship between the edge elements, and can determine a spatial position of the three-dimensional element in the projection view according to the collinearity identification between the edge elements. As shown in FIG. 3, the method specifically includes the following steps.

In S101, a bounding box of each three-dimensional element in a visualization interface is determined, the bounding box of each three-dimensional element being a frame of a preset shape in the visualization interface and capable of accommodating each three-dimensional element, and the frame of the preset shape being a frame with a regular shape and straight edges.

The bounding box is a frame with a regular shape determined according to length, width and height dimensions of the three-dimensional element. The bounding box may be a frame with a regular shape and straight edges, such as a cube, a cuboid, a quadrangular prism or a hexagonal prism, and is configured to accommodate the three-dimensional element. Cuboids and cubes are easy to calculate, and it is generally considered that any three-dimensional element can be placed in a cube or cuboid; in consideration of this, optionally, a cube or cuboid accommodating a three-dimensional element may be considered as a bounding box of the three-dimensional element. Optionally, the bounding box may be a minimum cube or cuboid that can accommodate a three-dimensional element. It is to be noted that, since a shape of the straight edge may not be changed after two-dimensional projection of the straight edge, the user's perception of a position of the straight edge corresponding to the three-dimensional element is the same as that of a straight edge of a two-dimensional image obtained after the projection, so the bounding box is designed as a frame composed of straight lines.

In this embodiment, a coordinate system is established in the visualization interface, which may be an absolute coordinate system or a local coordinate system. This embodiment is described with an example in which an absolute coordinate system is established in the visualization interface. Coordinates of center points of each three-dimensional element can be determined according to the absolute coordinate system, and the coordinates of the center points are taken as coordinates of center points of the bounding box of the three-dimensional element. At the same time, length, width and height dimensions of the bounding box of the three-dimensional element can be determined according to length, width and height dimensions of the three-dimensional element. In a same visualization interface, a corresponding bounding box can be determined for each three-dimensional element. In addition, in a same visualization interface, a specific shape of a bounding box may be set according to a form of a three-dimensional element. For example, in a same visualization interface, bounding boxes of some three-dimensional elements are cubes, while bounding boxes of some three-dimensional elements are cuboids.

In S102, the bounding box of each three-dimensional element is projected in a target projection direction to obtain edge elements of the bounding box of each three-dimensional element in the visualization interface.

Figure 4:
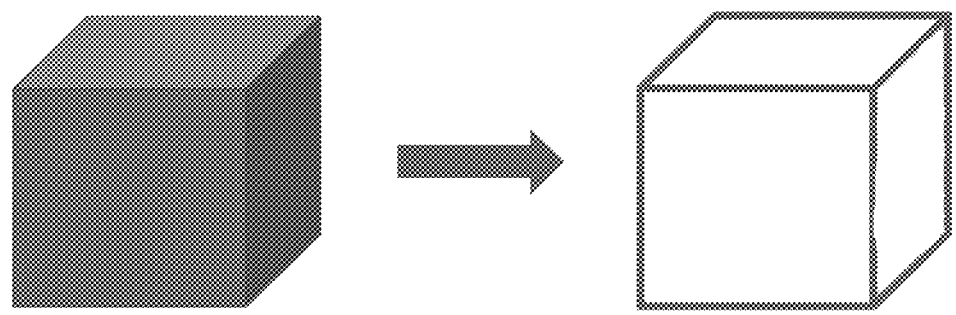
FIG. 4 is a schematic diagram of projecting a bounding box of a three-dimensional element.

The target projection direction is a view direction in which the bounding box of the three-dimensional element is projected onto a projection plane. The target projection direction may be any direction. Projection results obtained based on different target projection directions are different for a display result of the bounding box of the three-dimensional element. Since depth information is introduced into a three-dimensional element compared with a two-dimensional element, the influence of depth information should also be taken into account during the projection of the bounding box of the three-dimensional element. Optionally, when the target projection direction and a front view of the bounding box are at 45 degrees (45° to the left or 45° to the right), edges of the bounding box and the depth information of the three-dimensional element can be better displayed in the visualization interface. Further, in this embodiment, the projection may be perspective projection or orthogonal projection. This embodiment is described by taking orthogonal projection an example. In this embodiment, in a same visualization interface, bounding boxes of three-dimensional elements are projected in a same target projection direction. After projection, a projection shape of a bounding box can be presented in a projection plane. The projection shape includes a plurality of two-dimensional line segments, which are a plurality of edge elements of the bounding box. The edge elements provide boundary positions of the three-dimensional element. As shown in FIG. 4, FIG. 4 is a schematic diagram of edge elements obtained by projecting a bounding box of a three-dimensional element onto a projection plane. A shaded block on the left in FIG. 4 represents the bounding box of the three-dimensional element. A wireframe on the right includes 9 edge elements obtained after the projection of the bounding box of the three-dimensional element. Each edge of the bounding box is called an edge element and the edge element is a two-dimensional line segment. It is to be noted that, since the user generally cannot see an occluded part of the three-dimensional element, this embodiment only takes edge elements that can be displayed after projection as a research object.

In S103, at least one edge element set satisfying a first preset condition is determined according to positions of the edge elements in the visualization interface, and a collinearity identification corresponding to the edge element set is displayed in the visualization interface, the collinearity identification being configured to represent that edge elements in a same edge element set are collinear, and the first preset condition including belonging to different three-dimensional elements and a distance from a corresponding fitting line being less than a distance threshold.

Figure 5:
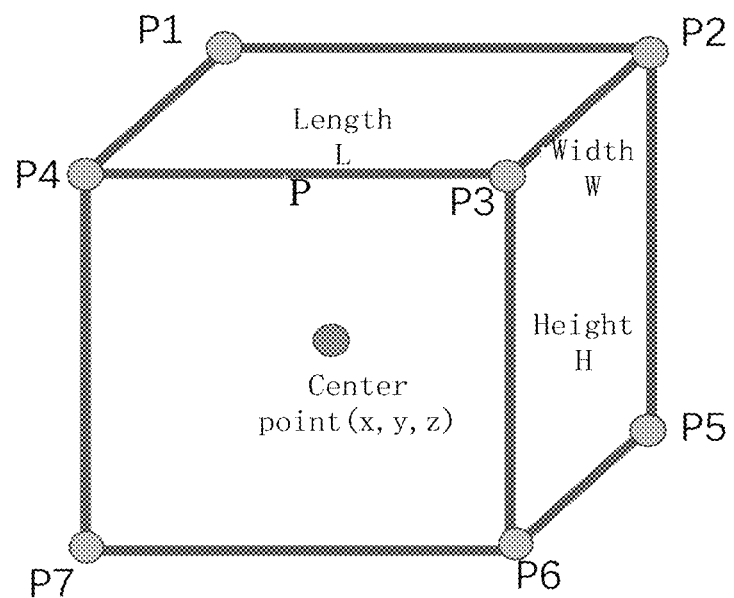
FIG. 5 is a schematic diagram of coordinates of vertices of the bounding box.
Figure 6:
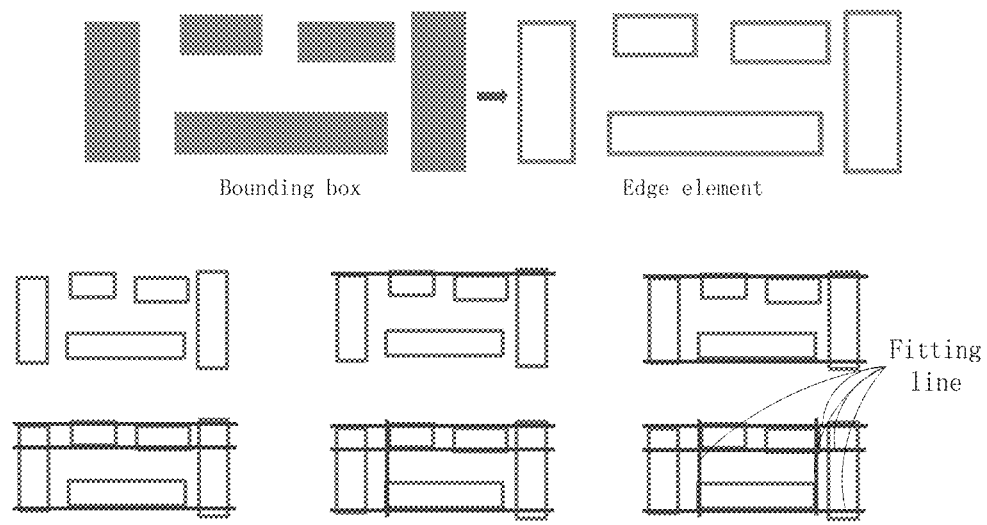
FIG. 6 is a flowchart of obtaining edge elements according to the bounding box and determining a fitting line according to the edge elements.
Figure 7:
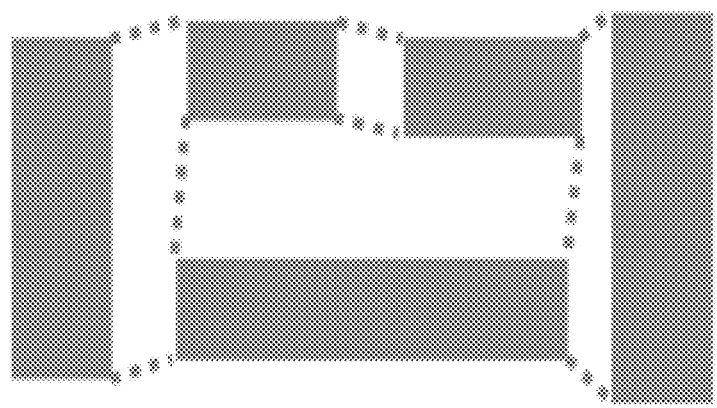
FIG. 7 is a schematic diagram of a collinearity identification displayed in a visualization interface.

Positions of the edge elements in the visualization interface are determined by coordinates of center points and length, width and height dimensions of the bounding box of the three-dimensional element. The positions of the edge elements in the visualization interface are coordinates of center points of the edge elements. As shown in FIG. 5, P1, P2, P3 . . . P7 are vertices of the edge elements. Position coordinates of each vertex can be determined according to a center point (x, y, z) of the bounding box and length L, width W and height H dimensions of the bounding box. Correspondingly, a length of an edge element located between any two vertices and a position of a center point of the edge element can be determined according to the position coordinates of each vertex, for example, a length of an edge element located between vertices P4 and P3 and coordinates of a center point P of the edge element. The fitting line is obtained after fitting according to the position of the edge element through a specific fitting algorithm. As shown in FIG. 6, FIG. 6 shows a process of projecting a bounding box to obtain edge elements and fitting the edge elements to obtain a plurality of fitting lines. The following processing can be performed according to the fitting lines obtained in FIG. 6: if distances between edge elements near a same fitting line to the fitting line satisfy a first preset relationship, edge elements corresponding to the same fitting line are classified into an edge element set, the edge elements in a same edge element set belong to different three-dimensional elements, a plurality of edge elements in an edge element set are considered to have a position relationship of being on a same straight line and a position relationship between the edge elements belonging to the same edge element set, so as to display, according to the fitting lines in FIG. 6, a collinearity identification (such as the dashed line in FIG. 7) between the edge elements belonging to the same edge element set. In this embodiment, the collinearity identification can be expressed in a variety of ways, such as a dashed line, a dotted line, a wavy line, text, and graphics.

Figure 8:
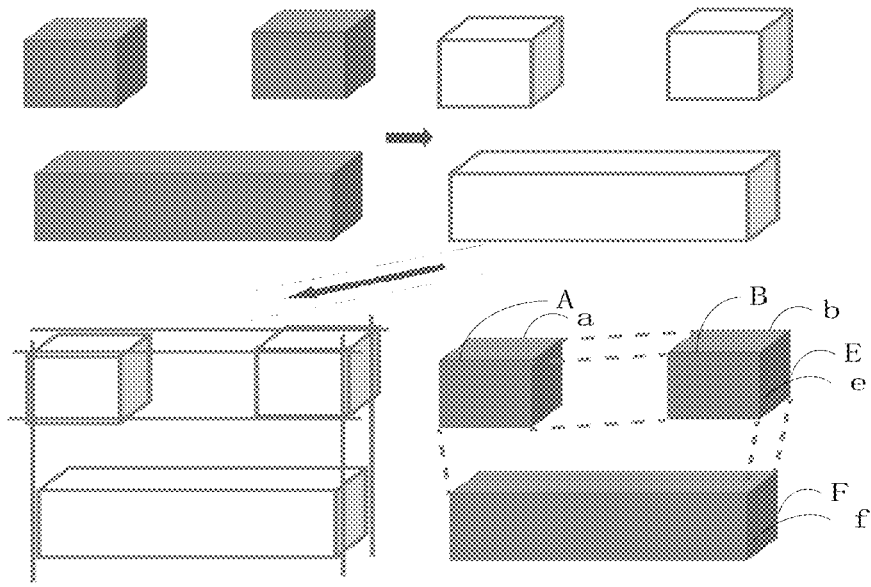
FIG. 8 is a schematic process diagram of obtaining the collinearity identification according to the three-dimensional element layout visualization method.

In this embodiment, as shown in FIG. 8, with the above method, a plurality of edge element sets can be obtained by classifying edge elements having a collinearity relationship, and the edge elements included in each edge element set have a collinearity relationship. The "have a collinearity relationship" indicates that the edge elements included in an edge element set have a position relationship of being on a same straight line. Therefore, the user can clarify the position relationship between the edge elements according to the displayed collinearity identification, so as to determine a spatial position relationship between three-dimensional elements corresponding to the edge elements. For example, in FIG. 8, a collinearity identification exists between edge elements A and B, a collinearity identification exists between edge elements a and b, and then the user can determine that upper surfaces of the two three-dimensional elements are located on a same plane; a collinearity identification exists between edge elements E and F, a collinearity identification exists between edge elements e and f, and then the user can determine that right side surfaces of the two three-dimensional elements are located on a same plane and that the two three-dimensional elements are located at different heights. By this analogy, the user can determine the spatial position relationship between the three-dimensional elements corresponding to the edge elements through the collinearity identifications between the edge elements. A purpose of representing a spatial position of a three-dimensional element with a collinearity identification between edge elements of the three-dimensional element in a visualization interface is achieved. In the above embodiment, a bounding box of a three-dimensional element is projected in a visualization interface according to a target projection direction, so that edge elements corresponding to the three-dimensional element can be displayed in a projection view, and the edge elements with a distance to a fitting line less than a distance threshold can be filtered, according to positions of the edge elements in the visualization interface, to form at least one edge element set. The edge elements in a same edge element set belong to different three-dimensional elements, and the edge elements belonging to the same edge element set are on a same straight line. Therefore, a collinearity identification is displayed between the edge elements on the projection view, so that the user can determine a spatial position relationship between the three-dimensional elements corresponding to the edge elements according to a position relationship between the edge elements in the projection view, which improves intelligence compared with the prior art in which the user is required to combine relative positions in a plurality of two-dimensional graphs to determine spatial positions of three-dimensional elements.

Figure 9:
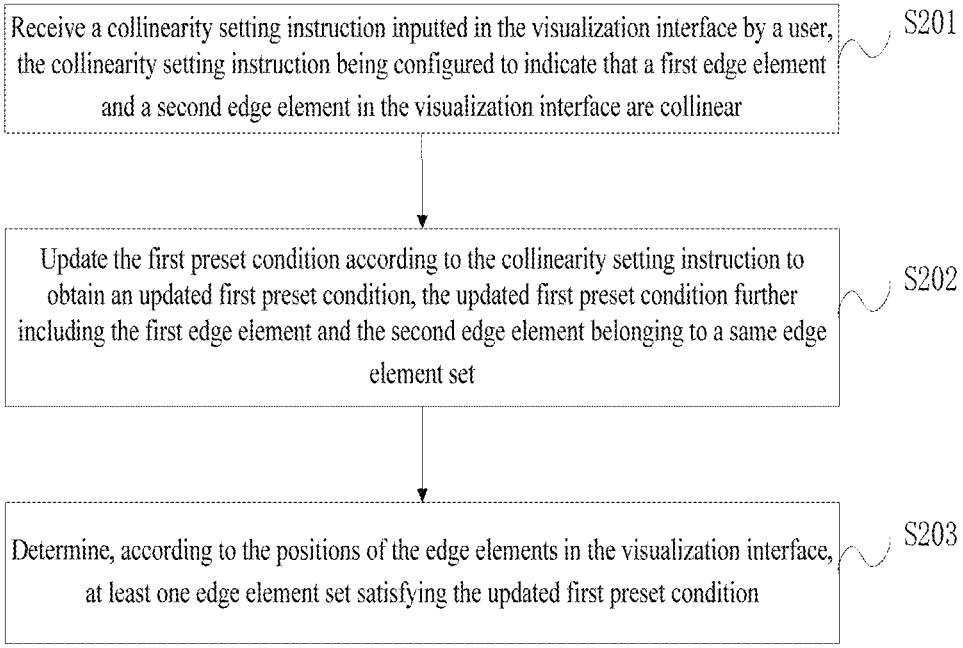
FIG. 9 is a flowchart of a three-dimensional element layout visualization method according to an embodiment.

In some special scenarios, many possible collinearity relationships exist between the three-dimensional elements, one of which is the collinearity relationship determined according to the first preset condition, and the determined collinearity relationship may not be the one expected by the user; therefore, in consideration of this, optionally, in order to improve the accuracy of the displayed spatial position relationship, the user may be allowed to input a collinearity setting instruction for setting a collinearity relationship and to determine a more accurate collinearity relationship according to the collinearity setting instruction. As shown in FIG. 9, the method specifically includes the following steps. In S201, a collinearity setting instruction inputted in the visualization interface by a user is received, the collinearity setting instruction being configured to indicate that first and second edge elements in the visualization interface are collinear.

Figure 10:
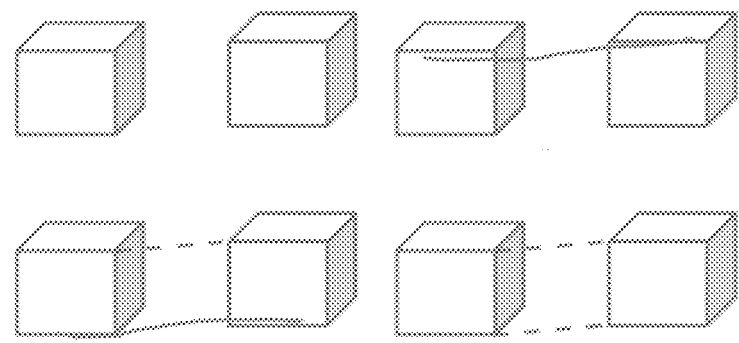
FIG. 10 is a schematic diagram of executing a collinearity setting instruction.

The collinearity setting instruction may be inputted through a mouse, a touch screen or other devices by the user, which may be, for example, to arrange a connection line between two edge elements. The collinearity setting instruction is an instruction of arranging a connection line between the first and second edge elements. As shown in FIG. 10, a connection line is arranged between the first and second edge elements, a collinearity relationship is successfully added between the first and second edge elements, and a collinearity identification represented by a dashed line is generated between the first and second edge elements according to the connection line. The user can input a plurality of collinearity setting instructions to establish different collinearity relationships. As shown in FIG. 10, after generation of a previous group of collinearity identifications, a connection line may also be set between other first and second edge elements, and a collinearity identification represented by a dashed line may be generated between the corresponding first and second edge elements according to the connection line newly inputted. The first and second edge elements in this embodiment have no sequential relationship and are only used to indicate two different edge elements. The user can input collinearity setting instructions for a plurality of edge elements at the same time.

In S202, the first preset condition is updated according to the collinearity setting instruction to obtain an updated first preset condition, the updated first preset condition further including the first and second edge elements belonging to a same edge element set. Since the collinearity setting instruction clarifies that, in the visualization interface, one edge element is the first edge element and another edge element is the second edge element and clarifies a collinearity relationship between the two, when the position relationship between the edge elements determined according to the first preset condition prior to update is in conflict with the position relationship between the edge elements determined according to the first preset condition after update, the position relationship between the edge elements included in the edge element set determined according to the first preset condition after update is applicable. The corresponding updated first preset condition includes: belonging to different three-dimensional elements, a distance from a corresponding fitting line being less than a distance threshold, and the first and second edge elements belonging to a same edge element set.

Figures 11A, 11B:
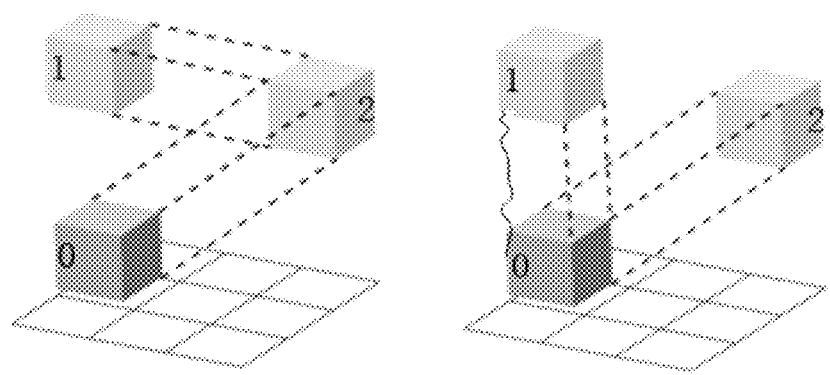
FIG. 11(a) to FIG. 11(b) are schematic diagrams of results of execution of the collinearity setting instruction.

In S203, at least one edge element set satisfying the updated first preset condition is determined according to the positions of the edge elements in the visualization interface. In this embodiment, after the first preset condition is updated, edge elements belonging to an edge element set are required to be selected according to the updated first preset condition. For example, FIG. 11(a) shows a spatial position relationship between three-dimensional elements displayed through collinearity identifications in a visualization interface, FIG. 11(b) shows a spatial position relationship between three-dimensional elements needed by a user, and in FIG. 11(a), three-dimensional elements 0, 1 and 2 are on a same plane. The user determines that the position relationship displayed in FIG. 11(a) is not the position relationship needed by the user, and thus the user's editing is needed. An editing process is, for example, as follows: a collinearity setting instruction is inputted, a connection line is displayed between edge elements 1 and 0, so as to update the first preset condition according to first and second edge elements corresponding to the collinearity setting instruction and a collinearity relationship between the two, a new edge element set is determined according to the updated first preset condition, a collinearity identification represented by a dashed line is generated between the three-dimensional elements 1 and 0, to present the position relationship as shown in FIG. 11 (b). In the above embodiment, the user inputs the collinearity setting instruction, so that the user can easily edit the collinearity relationship between the edge elements of the three-dimensional element, so as to achieve a target layout that the user wants.

Figure 12:
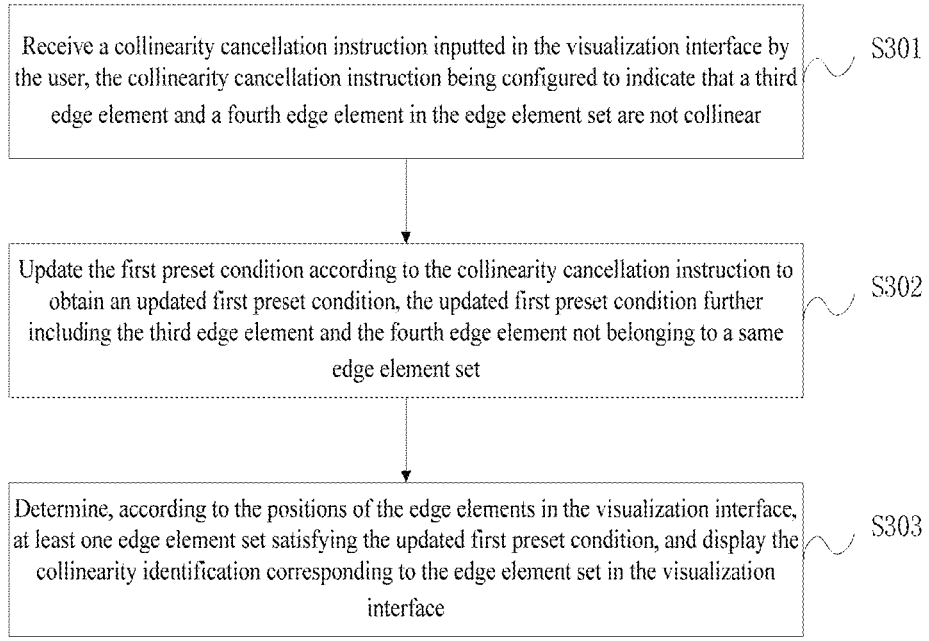
FIG. 12 is a flowchart of a three-dimensional element layout visualization method according to an embodiment.

In some special scenarios, the collinearity relationship determined according to the first preset condition does not meet the user's needs. For example, two edge elements determined according to the first preset condition have a collinearity relationship, but in fact, the user does not require the two edge elements to be collinear; therefore, in consideration of the above, optionally, in order to improve the accuracy of the displayed spatial position relationship, the user may be allowed to input a collinearity cancellation instruction for canceling a collinearity relationship and to determine a more accurate collinearity relationship according to the collinearity cancellation instruction. As shown in FIG. 12, the method specifically includes the following steps: after the step of displaying a collinearity identification corresponding to the edge element set in the visualization interface, the following steps may also be performed.

Figure 13:
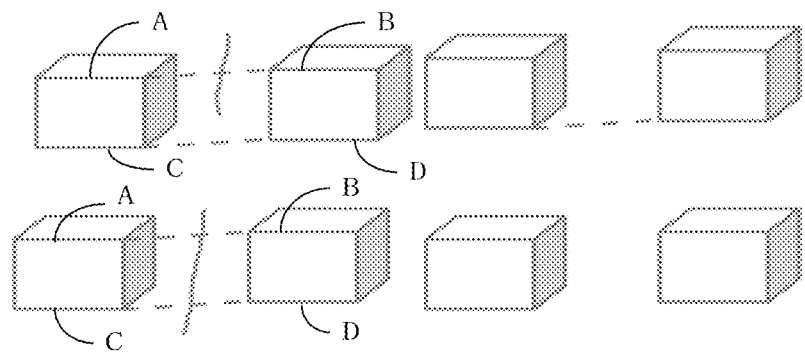
FIG. 13 is a schematic diagram of executing a collinearity cancellation instruction.

In S301, a collinearity cancellation instruction inputted in the visualization interface by the user is received, the collinearity cancellation instruction being configured to indicate that third and fourth edge elements in the edge element set are not collinear. The collinearity cancellation instruction may be inputted through a mouse, a touch screen or other devices by the user, which may be, for example, to input a through-line on a collinearity identification between two edge elements. The collinearity cancellation instruction is an instruction of arranging a through-line through a collinearity identification on a collinearity identification between the third and fourth edge elements. As shown in FIG. 13, collinearity identifications exist between edge elements A and B and between edge elements C and D. For example, a through-line through a collinearity identification may be arranged between the edge elements A and B, so as to cancel the collinearity identification between the edge elements A and B. No through-line is set for the collinearity identification between the edge elements C and D, and thus the collinearity identification between the edge elements C and D is not affected. In addition, one through-line may also run through a plurality of collinearity identifications between the edge elements A and B and between the edge elements C and D, and then the collinearity identifications between the edge elements A and B and between the edge elements C and D are all deleted. In this embodiment, the third and fourth edge elements in this embodiment have no sequential relationship and are only used to indicate two different edge elements.

In S302, the first preset condition is updated according to the collinearity cancellation instruction to obtain an updated first preset condition, the updated first preset condition further including the third and fourth edge elements not belonging to a same edge element set. Since the collinearity cancellation instruction clarifies that, in the visualization interface, one edge element is the third edge element and another edge element is the fourth edge element and that the two have no collinearity relationship, when the position relationship between the edge elements determined according to the first preset condition prior to update is in conflict with the position relationship between the edge elements determined according to the first preset condition after update, the position relationship between the edge elements included in the edge element set determined according to the first preset condition after update is applicable. The corresponding updated first preset condition includes: belonging to different three-dimensional elements, a distance from a corresponding fitting line being less than a distance threshold, and the third and fourth edge elements not belonging to a same edge element set.

In S303, at least one edge element set satisfying the updated first preset condition is determined according to the positions of the edge elements in the visualization interface, and the collinearity identification corresponding to the edge element set is displayed in the visualization interface.

Figures 14A, 14B:
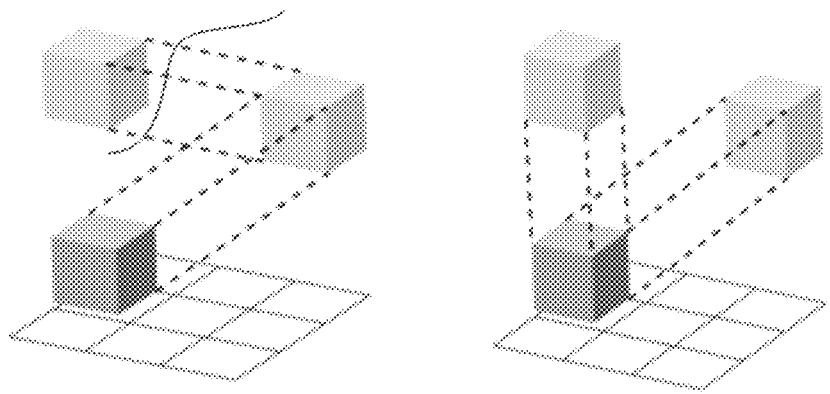
FIG. 14(a) to FIG. 14(b) are schematic diagrams of results of execution of the collinearity cancellation instruction.
Figure 15:
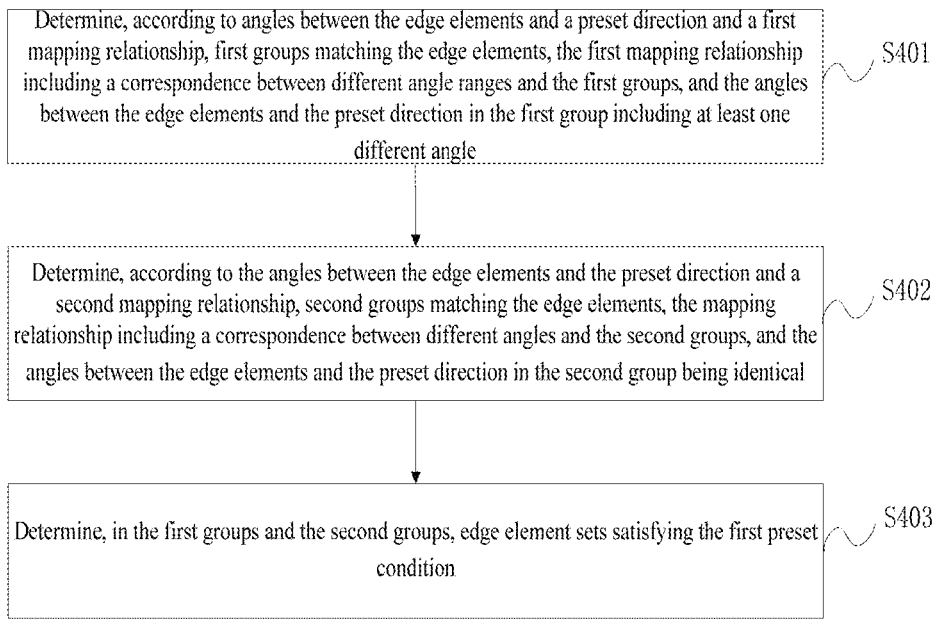
FIG. 15 is a flowchart of a three-dimensional element layout visualization method according to an embodiment.

In this embodiment, after the first preset condition is updated, edge elements belonging to an edge element set are selected according to the updated first preset condition. For example, FIG. 14(a) shows a position relationship displayed in the visualization interface, from which it can be seen that three three-dimensional elements are located in a same plane. However, the user does not require three three-dimensional elements to be located in a same plane, and thus inputs a collinearity cancellation instruction for a plurality of collinearity identifications; that is, a through-line is drawn across three collinearity identifications between the three-dimensional elements, and the crossed collinearity identifications disappear. Further, the user may input a collinearity setting instruction to establish a collinearity relationship between edge elements previously having no collinearity relationship, and a collinearity identification is displayed, so as to present the content shown in FIG. 14(b). In the above embodiment, the user inputs the collinearity cancellation instruction, so that the user can easily modify the detected collinearity relationship, so as to achieve a target layout that the user wants. In another application scenario, in three-dimensional modeling, a position relationship between edge elements may be parallel or vertical, or may be non-parallel and non-vertical; therefore, during determination of an edge element set, all edge elements are required to be classified, edge elements in a same direction and at a same angle are classified into a second group, edge elements in a same direction but at different angles are classified into a first group, and the edge element set satisfying the first preset condition is determined in each first group or each second group. Specifically, as shown in FIG. 15, the following steps are included.

In S401, first groups matching the edge elements are determined according to angles between the edge elements and a preset direction and a first mapping relationship, the first mapping relationship including a correspondence between different angle ranges and the first groups, and the angles between the edge elements and the preset direction in the first group including at least one different angle. The preset direction may be a user-defined or system-defaulted reference direction for determining whether the edge elements are parallel or perpendicular to each other. A preset direction is arranged in a visualization interface. Optionally, the preset direction may be an X-axis extension direction or a Y-axis extension direction. The first mapping relationship may be, for example, shown in Table 1:

TABLE 1

| Angle range | Group |
|---|---|
| [−1, 1] | First group 1 |
| [89, 91] | First group 2 |
| [44, 46] | First group 3 |

It is to be noted that the angle ranges listed in Table 1 are examples only and do not cover all possible ranges. For example, angles between four edge elements and the preset direction are 0°, 0°, −0.3° and 0° respectively, and then the four edge elements are classified into first groups and into a first group 1 in the first groups. It is considered that the edge elements belonging to the first group 1 are in a same direction, the edge elements belonging to the first group 2 are in a same direction, and the edge elements belonging to the first group 3 are in a same direction. In the edge elements belonging to the first groups, an angle between at least one edge element and the preset direction is different from angles between other edge elements and the preset direction.

In S402, second groups matching the edge elements are determined according to angles between the edge elements and the preset direction and a second mapping relationship, the mapping relationship including a correspondence between different angles and the second groups, and the angles between the edge elements and the preset direction in the second group being identical. The second mapping relationship may be, for example, shown in Table 2:

TABLE 2

| Angle | Group |
|---|---|
| 0 | Second group 1 |
| 90 | Second group 2 |
| 45 | Second group 3 |

It is to be noted that the angles listed in Table 2 are examples only and do not cover all possible angles. For example, angles between four edge elements and the preset direction are 0°, 0°, 0° and 0° respectively, and then the four edge elements are classified into second groups and into a second group 1 in the second groups. The edge elements belonging to the second group 1 are in a same direction, the edge elements belonging to the second group 2 are in a same direction, and the edge elements belonging to the second group 3 are in a same direction.

In S403, edge element sets satisfying the first preset condition are determined in the first groups and the second groups. Through step S401 and step S402, the edge elements in a same direction can be classified into one group, and then an edge element set satisfying the first preset condition is filtered from each group. A specific filtering process may be obtained with reference to the contents disclosed in step S103. In the above embodiment, a position relationship between edge elements is determined according to angles between the edge elements and a preset direction, a second group is determined according to edge elements parallel or perpendicular to each other, and a first group is determined according to edge elements having an angle relationship; then, an edge element set in the first group satisfying a first preset condition is determined according to a calculation manner corresponding to the first group, and an edge element set in the second group satisfying the first preset condition is determined according to a calculation manner corresponding to the second group; in this way, an edge element set is determined by selecting a corresponding calculation manner for edge elements having different angle relationships, so as to avoid the problem that some edge elements are determined as failure points when the edge element set is determined in an inappropriate calculation manner, which leads to omission of edge elements and low accuracy of the edge element set.

Figure 16:
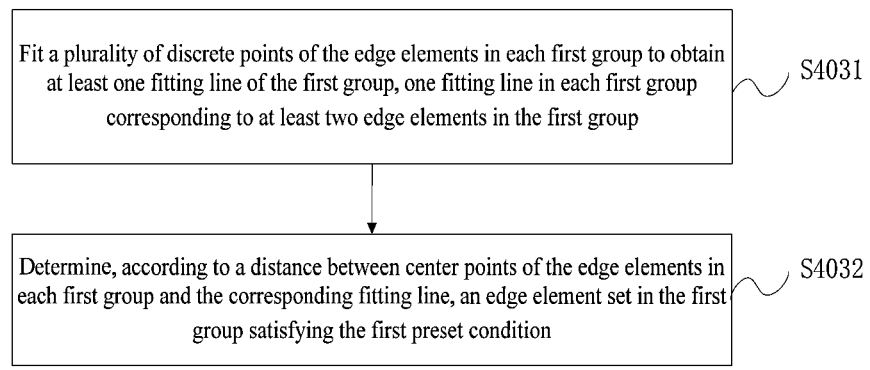
FIG. 16 is a flowchart of a three-dimensional element layout visualization method according to an embodiment.

On the basis of the above embodiment, this embodiment specifically describes a process of determining, in the first group, an edge element set satisfying the first preset condition, as shown in FIG. 16.

In S4031, a plurality of discrete points of the edge elements in each first group are fitted to obtain at least one fitting line of the first group, one fitting line in each first group corresponding to at least two edge elements in the first group. Specifically, discrete points are extracted for each edge element in the first group, so that each edge element is represented by some uniform points, and then edge elements are transformed into point elements. When a position relation of the edge elements is detected, a fitting line can be fitted by using a least square method according to positions of the point elements. The fitting line is fitted by at least two edge elements. The positions of the point elements are determined according to positions and lengths of the edge elements. Since in the edge elements belonging to the first groups, an angle between at least one edge element and the preset direction is different from angles between other edge elements and the preset direction, it is required to determine, from an aspect of "an angle between the edge element and the fitting line", whether the edge elements correspond to a fitting line obtained by fitting according to the edge elements, specifically to determine whether the angle between the edge element and the fitting line satisfies $d_f \cdot d_t \in [\theta, 1]$, where $d_f$ is a direction of the fitting line, $d_t$ is a direction of a straight line where a $t^{th}$ edge element is located, and $\theta$ is an empirical value, which achieves an optimal effect when set to 0.95 in an experiment.

In S4032, an edge element set in the first group satisfying the first preset condition is determined according to a distance between center points of the edge elements in each first group and the corresponding fitting line. After the determination is performed from the aspect of "an angle between the edge element and the fitting line" in step S4031, taking a $t^{th}$ edge element as an example, it is further required to confirm whether the $t^{th}$ edge element satisfies the first preset condition that a distance to the fitting line is less than a distance threshold. Edge elements satisfying the first preset condition are classified into one edge element set. It is to be noted that the setting of the distance threshold is correlated with a length of the edge element. In this embodiment, the distance threshold is denoted by r, which is required to satisfy the following condition:

$$r = \min(\bar{r}(1+\sigma)h(t), 2\bar{r})$$

where $\bar{r}$ is an average value of lengths of all the edge elements in the visualization interface multiplied by a fixed factor, where the fixed factor is an empirical value, which achieves an optimal effect when set to 0.125 in the experiment. $\sigma$ is a threshold coefficient, $h(t)=e^{-d(L,L_t)^2}$ L denotes the fitting line, and $L_t$ denotes the $t^{th}$ edge element. $d(L, L_t)$ denotes a distance from the $t^{th}$ edge element to the fitting line. Through step S4031 and step S4032, the edge elements are filtered from two aspects, i.e., an angle between the edge element and the fitting line and a distance from the edge element to the fitting line, thereby improving the accuracy of the collinearity relationship between edge elements in a same edge element set.

Figure 17:
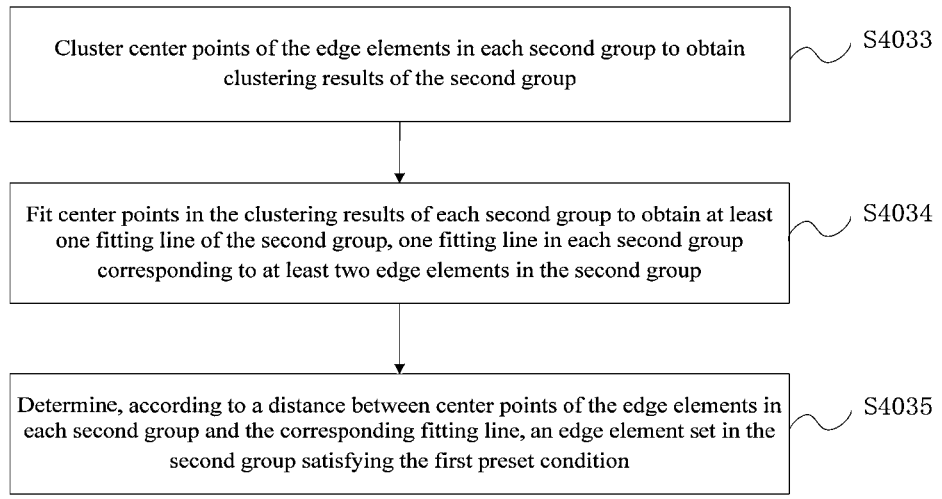
FIG. 17 is a flowchart of a three-dimensional element layout visualization method according to an embodiment.

In another application scenario, this embodiment specifically describes a process of determining, in the second group, an edge element set satisfying the first preset condition, as shown in FIG. 17.

In S4033, center points of the edge elements in each second group are clustered to obtain clustering results of the second group.

Figure 18:
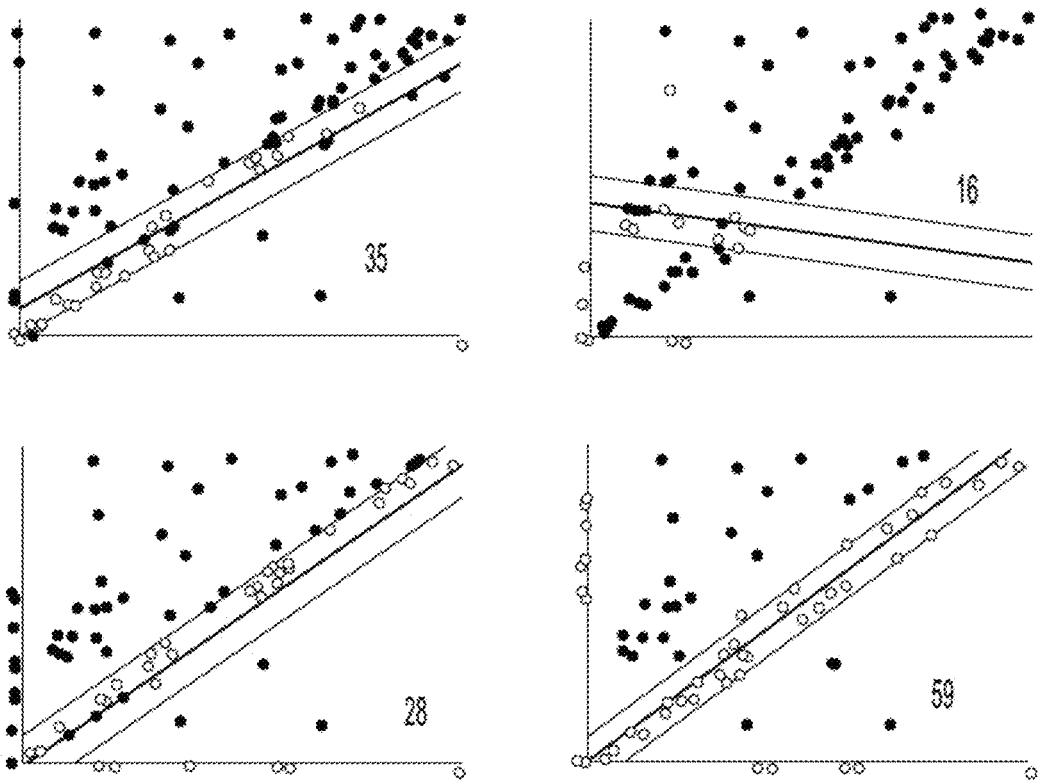
FIG. 18 shows 4 initial clustering result graphs presented in a clustering operation process.

A clustering algorithm is a process of clustering several edge elements into one group through a particular rule. In this embodiment, coordinates of the center points of the edge elements in the second group are taken as inner points of the clustering algorithm, and then the inner points are clustered according to a preset condition. A specific operation process is not described in detail herein. As shown in FIG. 18, FIG. 18 shows 4 initial clustering result graphs presented in a clustering operation process. It can be seen from the 4 initial clustering result graphs that the number in each initial clustering result graph represents a number of clustered inner points corresponding to the initial clustering result graph. One initial clustering result graph includes 59 inner points; that is, 59 edge elements in the initial clustering result graph are classified into one group, which is an initial clustering result graph including a maximum number of edge elements. Positions of edge elements corresponding to the 59 inner points included in the initial clustering result graph are marked as clustering results of this clustering operation. Further, the 59 inner points are removed, the clustering operation is performed on the remaining inner points again according to the above clustering process, positions of edge elements corresponding to the inner points included in the initial clustering result graph including most inner points clustered are taken as clustering results, and the process is repeated, until no more inner points are found and all the clustering results of the second group are obtained.

In S4034, center points in the clustering results of each second group are fitted to obtain at least one fitting line of the second group, one fitting line in each second group corresponding to at least two edge elements in the second group.

Each clustering result includes a plurality of inner points, that is, includes a plurality of edge elements. The plurality of edge elements corresponding to each clustering result are fitted to obtain a fitting line of the clustering result. A fitting process may involve: selecting $i^{th}$ edge element as a fitting line 1; searching for an $i+1^{th}$ edge element nearest to the fitting line 1 according to the fitting line 1 to fit the fitting line 1 with the $i+1^{th}$ edge element to obtain a fitting line 2; searching the remaining edge elements other than the first i+1 edge elements of the clustering result for an $i+2^{th}$ edge element nearest to the new fitting line according to the fitting line 2, then the fitting line 2 and the found $i+2^{th}$ edge element are fitted to obtain a fitting line 3, and so on, until all the edge elements are fitted to obtain the fitting line 1, the fitting line 2, the fitting line 3, . . . of the clustering result.

In S4035, an edge element set in the second group satisfying the first preset condition is determined according to a distance between center points of the edge elements in each second group and the corresponding fitting line. During the above fitting, in the process of fitting the edge elements included in each clustering result in the second group, a plurality of fitting lines can be fitted for each clustering result. For each fitting line corresponding to an obtained clustering result, edge elements in the corresponding cluster result with a distance from the fitting line less than a distance threshold are searched for and a number of the edge elements is recorded. A fitting line corresponding to a maximum number of edge elements is taken as the fitting line corresponding to the clustering result, and an edge element set is determined according to the fitting line corresponding to the clustering result and the edge elements corresponding to the fitting line. Through step S4033 and step S4034, edge elements are classified through a clustering algorithm to obtain clustering results, the edge elements in the clustering results are fitted to obtain a fitting line, edge elements satisfying the first preset condition are classified into one edge element set according to the fitting line, and the obtained edge element set can accurately divide each edge element, so that a position relation of the edge elements is more accurate.

Figure 19:
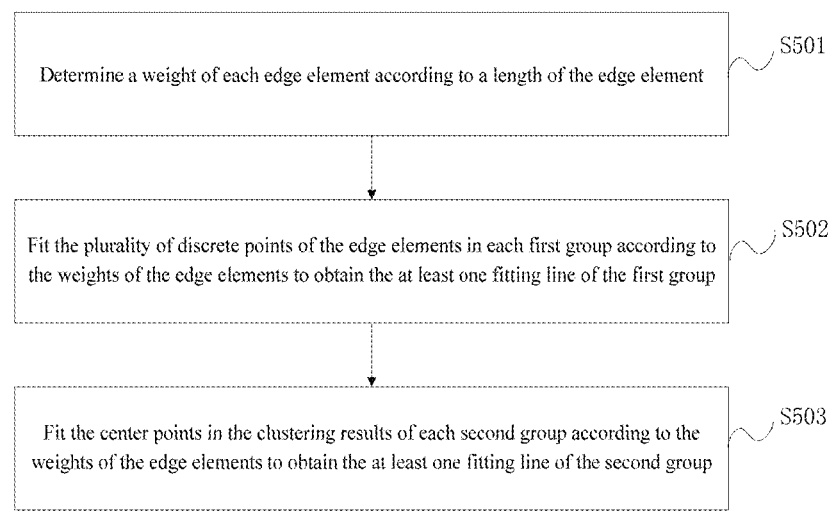
FIG. 19 is a flowchart of a three-dimensional element layout visualization method according to an embodiment.

In another application scenario, the edge elements have different lengths, and the larger the length of the edge element, the greater the influence of the edge element on the fitting line during fitting; in consideration of this, in order to improve the accuracy of the fitting line obtained by fitting according to the edge elements, optionally, in this embodiment, the fitting line is obtained by combining lengths of the edge elements and positions of the edge elements, so as to ensure that the determined fitting line can better filter the position relationship between the edge elements. As shown in FIG. 19, the following steps are specifically included.

In S501, a weight of each edge element is determined according to a length of the edge element. The weight of each edge element is calculated based on the formula $W(s)=e^{-\alpha^2/l(s)^2}$, where $\alpha$ is a weight coefficient, which is an empirical value, and l(s) is the length of the edge element.

The step of fitting a plurality of discrete points of the edge elements in each first group to obtain at least one fitting line of the first group includes: S502: fitting the plurality of discrete points of the edge elements in each first group according to the weights of the edge elements to obtain the at least one fitting line of the first group. A specific process involves: assigning values to discrete points of each edge element according to the weight W(s) of the edge element. Specifically, for example, the weight of the edge element A is 0.8, five discrete points are extracted from the edge element A, which are a1, a2, a3, a4 and a5 respectively, and coordinates of each discrete point are multiplied by the weight of the edge element to obtain new coordinate values corresponding to the five discrete points respectively. The weight of the corresponding edge element B is 0.4, five discrete points are extracted from the edge element B, which are b1, b2, b3, b4 and b5 respectively, and coordinates of each discrete point are multiplied by the weight of the edge element to obtain new coordinate values corresponding to the five discrete points respectively. New coordinate values corresponding to the edge element A and new coordinate values corresponding to the edge element B are fitted to obtain a fitting line. The step of fitting center points in the clustering results of each second group to obtain at least one fitting line of the second group includes:

S503: fitting the center points in the clustering results of each second group according to the weights of the edge elements to obtain the at least one fitting line of the second group. In a method substantially the same as step S502, for the weight W(s) of each edge element, coordinates of center points of edge elements in each clustering result are multiplied by the weight of the edge element, and a multiplication result is taken as coordinates of a center point of the edge element for fitting. A specific fitting process may be the contents of step S4034 and is not described in detail herein.

Figure 20:
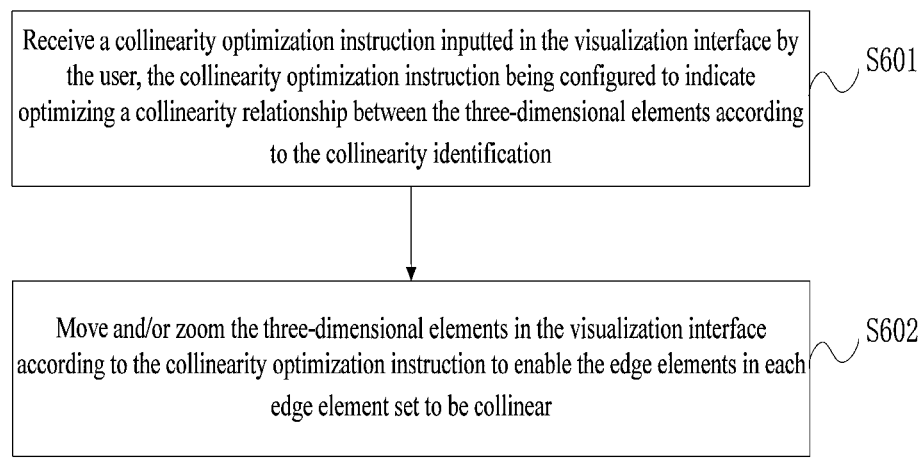
FIG. 20 is a flowchart of a three-dimensional element layout visualization method according to an embodiment.

Through step S502 and step S503, the weights of the edge elements can be introduced into the fitting process of the fitting line, so that the obtained fitting line can more accurately reflect the position relationship between the edge elements. Therefore, the fitting line determined according to the weights of the edge elements can better detect edge elements having a collinearity relationship, and the accuracy of the determined edge element set is improved. In another application scenario, the collinearity identification corresponding to the edge element set is displayed in the visualization interface, indicating that the collinearity relationship between the edge elements marked with the collinearity identification has been detected, and then positions of the edge elements and three-dimensional elements corresponding to the edge elements are adjusted according to the detected collinearity relationship to enable the edge elements having the collinearity relationship to be in a collinear state. As shown in FIG. 20, the specific process is as follows.

In S601, a collinearity optimization instruction inputted in the visualization interface by the user is received, the collinearity optimization instruction being configured to indicate optimizing a collinearity relationship between the three-dimensional elements according to the collinearity identification. The collinearity optimization instruction may be inputted through a mouse, a touch screen or other devices by the user. The collinearity optimization instruction is configured to indicate adjusting positions of the edge elements having a collinearity relationship to a straight line and correspondingly adjusting spatial positions of the three-dimensional elements corresponding to the edge elements.

In S602, the three-dimensional elements in the visualization interface are moved and/or zoomed according to the collinearity optimization instruction to enable the edge elements in each edge element set to be collinear. As shown in FIG. 21(a), a schematic diagram of edge elements having a collinearity relationship displayed on bounding boxes is shown. FIG. 21(b) shows adjustment of edges having a collinearity relationship to a straight line according to a collinearity optimization instruction, so that the edge elements are aligned and the three-dimensional elements corresponding to the edge elements are also aligned to complete an optimization process. During the alignment, the edge elements may be aligned according to a reference line inputted by the user or according to a fitting line corresponding to the edge elements having a collinearity relationship, or according to edge elements of reference points selected by the user, which is not limited here.

Further, when a plurality of edge elements on one three-dimensional element have a collinearity relationship with all edge elements of other three-dimensional elements, that is, when the edge elements of the three-dimensional element are classified into two different edge element set respectively and are optimized according to the collinearity optimization instruction, the plurality of edge elements of the three-dimensional element are required to be aligned according to respective collinearity identifications, which may lead to a conflict. For example, when a first edge element of the three-dimensional element is aligned, the three-dimensional element as a whole is required to move up with the first edge element; when a second edge element of the three-dimensional element is aligned, the three-dimensional element as a whole is required to move down with the second edge element. In order to solve this problem, in this embodiment, a size of the bounding box of the three-dimensional element is required to be reduced or enlarged during execution of the collinearity optimization instruction. For example, as shown in Table 3, in this embodiment, the user may set weights for various parameters of the three-dimensional element. The larger the weight is, the more priority it is of during position adjustment; the smaller the weight is, the easier it is to change during position adjustment. For example, a weight of a two-dimensional position change is 1, and a weight of a size change is 20. Therefore, during optimization, it is preferred to change the positions of the edge elements to achieve the purpose of aligning the edge elements in a same edge element set. A weight of the collinearity relationship is 1000, which is maximum. Therefore, during position adjustment, two-dimensional positions, sizes and length-width-height ratios of the edge elements are required to be transformed in various forms, so as to achieve the purpose of aligning the edge elements in a same edge element set.

TABLE 3

| Parameter type | Weight |
| --- | --- |
| Two-dimensional position change | 1 |
| Size change | 20 |
| Collinearity relationship | 1000 |
| Length, width, and height ratio | 100 |

In the above embodiment, on the basis of completion of the detection of the collinearity relationship between the edge elements, the collinearity optimization instruction inputted by the user is received, and spatial positions of three-dimensional elements corresponding to the edge elements are adjusted according to the detected collinearity relationship between the edge elements, so that the three-dimensional elements have an alignment relationship, so as to achieve the target layout shown in FIG. 21(b). A purpose of confirming the spatial positions of the three-dimensional elements in a visualization interface according to the position relationship between the edge elements is achieved.

In another application scenario, the position relationship between the edge elements further includes an equidistance relationship. The collinearity relationship between the edge elements in the edge element set satisfying the first preset condition are described in detail in the above embodiment. In this embodiment, the equidistance relationship between the edge elements is described, which, as shown in FIG. 22, specifically involves: S701: determining, according to a distance between two edge elements in an edge element pair of the edge element set, at least one edge element pair set satisfying a second preset condition, the edge element pair being a pair of edge elements composed of adjacent edge elements; the second preset condition including a distance difference being less than a difference threshold.

After the collinearity identification corresponding to the edge element set is displayed in the visualization interface, the equidistance relationship between the edge elements in each edge element set is determined for the edge element set. Specifically, edge elements in an edge element set may be classified into a plurality of edge element pairs, each edge element pair includes two edge elements adjacent to each other, and a distance between the two edge elements, that is, spacing d of the edge element pair, can be determined according to positions and lengths of the two edge elements.

Spacing of a plurality of edge element pairs can be determined from an edge element set. An absolute value $|d1-d2|$ of a difference between spacing d1 and d2 of any two edge element pair is calculated, and $|d1-d2|$ is compared to a difference threshold. When $|d1-d2|$ is less than the difference threshold, indicating that a spacing difference between the two edge element pairs is less, it is considered that the edge elements in the two edge element pairs have an equidistance relationship. When $|d1-d2|$ is greater than the difference threshold, indicating that the spacing difference between the two edge element pairs is greater, the edge elements in the two edge element pairs have no equidistance relationship.

An edge element pair set is formed according to the edge elements having an equidistance relationship. The edge elements in a same edge element pair set have an equidistance relationship. A manner of determining the difference threshold is not limited in this embodiment. Optionally, the difference threshold may be set by the user or preset.

It is to be noted that, in this embodiment, the equidistance relationship between the edge elements may also be determined by: determining spacing between adjacent edge elements according to positions and lengths of the edge elements; and defining a distance between two spacing as: $dis=|d1-d2|/(d1+d2)$. It is determined whether the distance between the two spacing is less than a preset threshold. When the distance between the two spacing is less than the preset threshold, edge elements corresponding to the two spacing have an equidistance relationship.

Figure 23:
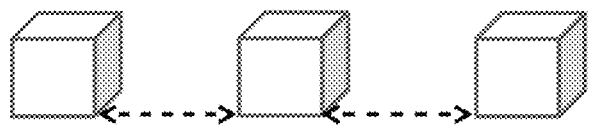
FIG. 23 is a schematic diagram of executing an equidistance setting instruction.

In S702, an equidistance identification corresponding to the edge element pair set is displayed in the visualization interface, the equidistance identification being configured to represent that distances between edge element pairs in a same edge element pair set are equal. The equidistance identification corresponding to the edge element pair set is an equidistance identification corresponding to each edge element pair in the edge element pair set. The equidistance identification is marked between two adjacent edge elements of each edge element pair, which, as shown in FIG. 23, is represented by a dotted line with double arrows. In this embodiment, as shown in FIG. 23, edge elements A and B form an edge element pair 1, and edge elements C and D form an edge element pair 2. Spacing of the edge element pair 1 is denoted by D1, spacing of the edge element pair 2 is denoted by D2, $|D1-D2|$ is less than the difference threshold, and the edge element pairs 1 and 2 have an equidistance relationship, and the edge element pairs 1 and 2 are classified into an edge element pair set. Equidistance identifications are expressed between the edge elements A and B and between the edge elements C and D respectively according to the equidistance identification corresponding to the edge element pair set, which indicates that distance between the edge elements A and B and between the edge elements C and D are equal. Through the above technical solution, the user can intuitively see a distance relationship between edge elements and three-dimensional elements corresponding to the edge elements through the equidistance identifications in the visualization interface, which provides help for the user to accurately determine spatial positions of the three-dimensional elements.

Figure 24:
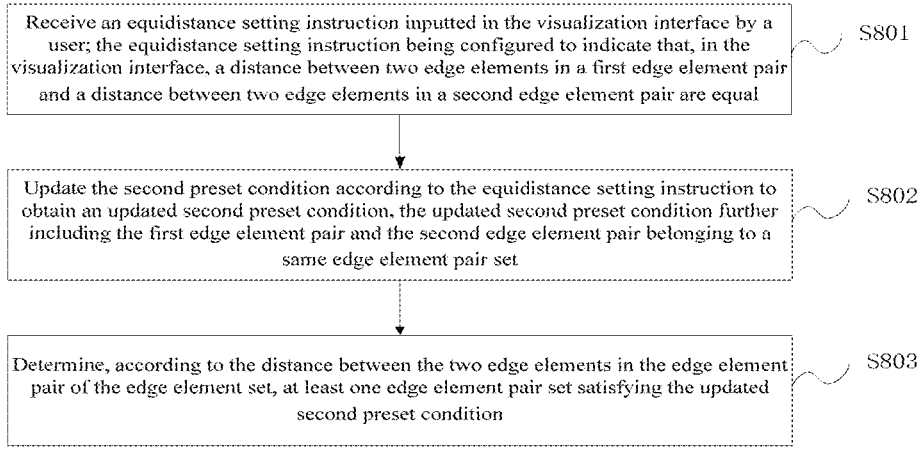
FIG. 24 is a flowchart of a three-dimensional element layout visualization method according to an embodiment.

In another application scenario, the user places a three-dimensional element at a rough position in the visualization interface, a current position of each three-dimensional element can be determined according to coordinates in the visualization interface, and a collinearity relationship and an equidistance relationship between edge elements are determined according to the current position of the three-dimensional element. The current position of each three-dimensional element has a great influence on a position relationship between the edge elements of the three-dimensional element, the current position of each three-dimensional element is determined by the user's placement, and a great uncertainty exists; therefore, a problem may occur that the equidistance relationship determined according to the current position of each three-dimensional element does not show the equidistance relationship needed by the user. In order to solve this problem, this embodiment proposes a specific process of editing the equidistance relationship between the edge elements by the user as needed. As shown in FIG. 24, the method specifically includes the following steps.

In S801, an equidistance setting instruction inputted in the visualization interface by a user is received; the equidistance setting instruction being configured to indicate that, in the visualization interface, a distance between two edge elements in a first edge element pair and a distance between two edge elements in a second edge element pair are equal.

The equidistance setting instruction may be inputted through a mouse, a touch screen or other devices by the user, which may be, for example, to arrange a connection line between two edge elements included in at least two edge element pairs respectively. The equidistance setting instruction is an instruction of arranging a connection line between first and second edge elements included in at least two edge element pairs respectively. For example, the user sets a connection line between edge elements A and B and between edge elements C and D respectively, and an equidistance relationship is successfully added between the edge elements A and B and between the edge elements C and D. Correspondingly, an equidistance identification represented by double arrows is added between the edge elements A and B and between the edge elements C and D. The first and second edge elements in this embodiment have no sequential relationship and are only used to indicate two different edge elements.

Since an equidistance relationship with different distances may exist in one edge element set having a collinearity relationship, the equidistance setting instruction further includes an equidistance addition setting instruction and an equidistance stop setting instruction. For example, edge elements A, B and C have an equidistance relationship, within a spacing range of about 1 cm, edge elements E, F and G also have an equidistance relationship, within a spacing range of about 15 cm, and then after an equidistance relationship is added to the edge elements A, B and C, the user is required to input the equidistance stop setting instruction, and the user inputs the equidistance addition setting instruction again to add an equidistance identification for the equidistance relationship among the edge elements E, F and G. The equidistance identification among the edge elements A, B and C is not correlated with the equidistance identification among the edge elements E, F and G.

In S802, the second preset condition is updated according to the equidistance setting instruction to obtain an updated second preset condition, the updated second preset condition further including the first and second edge element pairs belonging to a same edge element pair set.

When the equidistance relationship between two edge elements included in each edge element pair in the edge element pair set determined according to the second preset condition prior to update is in conflict with the equidistance relationship between two edge elements included in each edge element pair in the edge element pair set determined according to the second preset condition after update, the equidistance relationship between two edge elements included in each edge element pair in the edge element pair set determined according to the second preset condition after update is applicable. For example, the edge elements A, B and C determined according to the second preset condition prior to update are not equidistant but the edge elements A, B and C determined according to the second preset condition after update are equidistant, and then an equidistance identification is displayed among the edge elements A, B and C based on that the edge elements A, B and C have an equidistance relationship. Correspondingly, the updated second preset condition includes: a distance difference being less than a distance threshold, and the first and second edge element pairs belonging to a same edge element pair set.

In S803, at least one edge element pair set satisfying the updated second preset condition is determined according to the distance between the two edge elements in the edge element pair of the edge element set.

In this embodiment, after the second preset condition is updated, edge elements belonging to an edge element set are required to be selected according to the updated second preset condition. Specifically, an equidistance relationship is added between edge elements included in the first and second edge element pairs designed in the equidistance setting instruction, the first and second edge element pairs are classified into one edge element pair set, and then an equidistance threshold is determined according to a distance between two edge elements in the first edge element pair and a distance between two edge elements in the second edge element pair. The equidistance threshold is configured to determine a range of a distance between two adjacent edge elements. Edge elements between which a distance satisfies the equidistance threshold are classified into the edge element pair element where the first and second edge element pairs are located. Edge elements between which a distance cannot satisfy the equidistance threshold are re-classified to determine a new edge element pair set, and an equidistance identification is displayed between two edge elements included in each edge element pair in the new edge element pair set according to the new edge element pair set.

In the above embodiment, the user inputs the equidistance setting instruction, so that the user can easily edit the equidistance relationship between the edge elements of the three-dimensional element, so as to achieve a target layout that the user wants.

Figure 25:
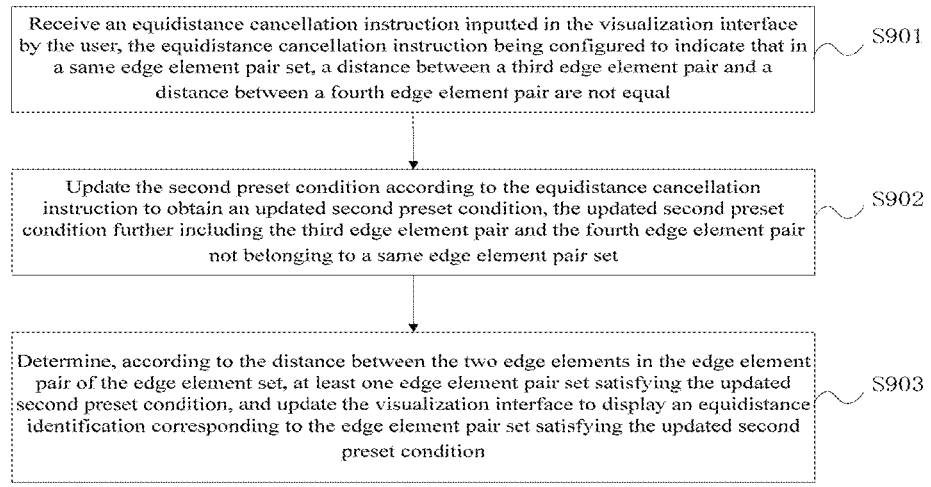
FIG. 25 is a flowchart of a three-dimensional element layout visualization method according to an embodiment.

In some special scenarios, the equidistance relationship determined according to the second preset condition may not be as expected by the user. For example, it is detected that two edge element pairs have an equidistance relationship, but in fact, the user does not require the two edge element pairs to be equidistant. In consideration of the above, optionally, in order to improve the accuracy of the displayed spatial position relationship, the user may be allowed to input an equidistance cancellation instruction for canceling an equidistance relationship and to determine a more accurate collinearity relationship according to the equidistance cancellation instruction. As shown in FIG. 25, the method specifically includes the following steps: after the step of displaying an equidistance identification corresponding to the edge element pair set in the visualization interface, the following steps may also be performed.

In S901, an equidistance cancellation instruction inputted in the visualization interface by the user is received, the equidistance cancellation instruction being configured to indicate that in a same edge element pair set, a distance between a third edge element pair and a distance between a fourth edge element pair are not equal. A through-line through the equidistance identification is set between the two edge elements included in the edge element pair. The equidistance cancellation instruction is an instruction of arranging a through-line on the equidistance identification between the third and fourth edge elements. The equidistance cancellation instruction may be inputted through a mouse, a touch screen or other devices by the user, which may be, for example, to arrange a through-line on an equidistance identification between two edge elements. The equidistance cancellation instruction is an instruction of arranging a through-line on the equidistance identification between the third and fourth edge elements. In this embodiment, the third and fourth edge elements have no sequential relationship and are only used to indicate two different edge elements.

In S902, the second preset condition is updated according to the equidistance cancellation instruction to obtain an updated second preset condition, the updated second preset condition further including the third and fourth edge element pairs not belonging to a same edge element pair set.

Since the equidistance cancellation instruction clarifies that two edge element pairs include third and fourth edge elements respectively and the two have no equidistance relationship, when the third and fourth edge elements included in the edge element pairs respectively determined according to the second preset condition prior to update have an equidistance relationship and the third and fourth edge elements included in the edge element pairs respectively determined according to the second preset condition after update have no equidistance relationship, the third and fourth edge elements included in the edge element pairs respectively determined according to the second preset condition after update having no equidistance relationship is applicable.

In S903, at least one edge element pair set satisfying the updated second preset condition is determined according to the distance between the two edge elements in the edge element pair of the edge element set, and the visualization interface is updated to display an equidistance identification corresponding to the edge element pair set satisfying the updated second preset condition. In this embodiment, after the second preset condition is updated, edge element pairs belonging to an edge element pair set are required to be selected according to the updated second preset condition. Specifically, the equidistance relationship between the third and fourth edge element pairs in the edge element pairs having an equidistance relationship that has been detected is removed, and the remaining equidistance relationships are unchanged.

Figure 26:
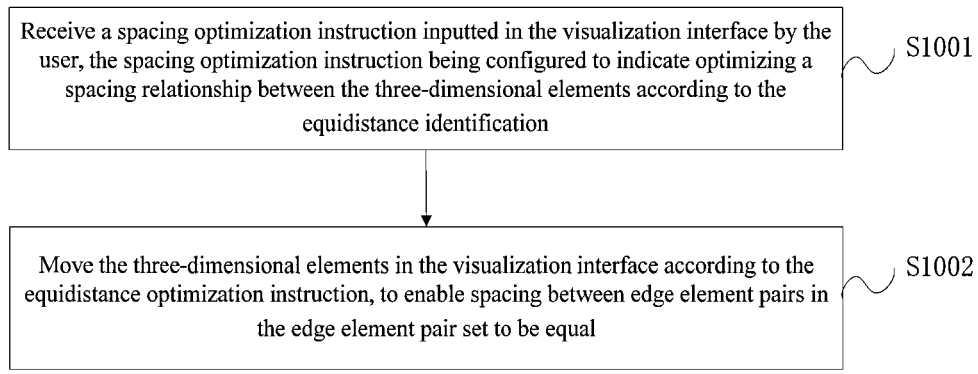
FIG. 26 is a flowchart of a three-dimensional element layout visualization method according to an embodiment.

In the above embodiment, the user inputs the equidistance cancellation instruction, so that the user can easily modify the detected equidistance relationship, so as to achieve a target layout that the user wants. In another application scenario, the equidistance identification corresponding to the edge element pair set is displayed in the visualization interface, indicating that the equidistance relationship between the edge elements marked with the equidistance identification has been detected, and then positions of the edge elements and three-dimensional elements corresponding to the edge elements are adjusted according to the detected equidistance relationship to enable the edge elements having the equidistance relationship to be in an equidistant state. As shown in FIG. 26, the specific process is as follows.

In S1001, a spacing optimization instruction inputted in the visualization interface by the user is received, the spacing optimization instruction being configured to indicate optimizing a spacing relationship between the three-dimensional elements according to the equidistance identification. The spacing optimization instruction may be inputted through a mouse, a touch screen or other devices by the user. The spacing optimization instruction is configured to indicate adjusting spacing between the edge elements in each edge element pair having an equidistance relationship to be equal and correspondingly enabling spacing between the three-dimensional elements corresponding to the edge element pair to be equal.

In S1002, the three-dimensional elements in the visualization interface are moved according to the spacing optimization instruction, to enable spacing between edge element pairs in the edge element pair set to be equal. As shown in FIG. 21(a), a schematic diagram of three-dimensional elements having an equidistance relationship displayed on bounding boxes is shown. As seen from FIG. 21(a), three-dimensional elements 2, 1, 0, 5 and 6 have equidistance identifications marked with dark double arrows therebetween, three-dimensional elements 0, 3 and 4 have equidistance identifications marked with light double arrows therebetween, which indicates that the three-dimensional elements 2, 1, 0, 5 and 6 have an equidistance relationship and the three-dimensional elements 0, 3 and 4 have an equidistance relationship, but a value of spacing between the three-dimensional elements 2, 1, 0, 5 and 6 is not the same as that between the three-dimensional elements 0, 3 and 4. A value of spacing between edge elements having an equidistance relationship may be an average value of distances between the edge elements having an equidistance relationship or a fixed value inputted by the user, which is not limited here. In the above embodiment, on the basis of completion of the detection of the equidistance relationship between the edge elements, the equidistance optimization instruction inputted by the user is received, and spatial positions of three-dimensional elements corresponding to the edge elements are adjusted according to the detected equidistance relationship between the edge elements, so that the three-dimensional elements have an equidistance relationship, so as to achieve the target layout shown in FIG. 21(b). A purpose of confirming the spatial positions of the three-dimensional elements in a visualization interface according to the position relationship between the edge elements is achieved.

Figure 27:
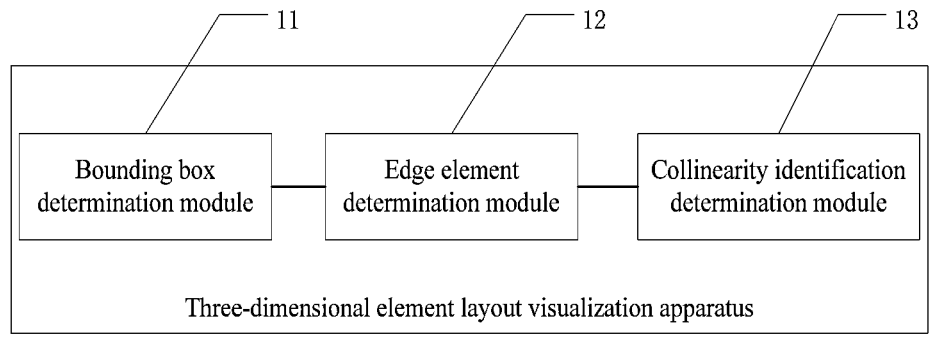
FIG. 27 is a schematic diagram of a three-dimensional element layout visualization apparatus according to an embodiment.

In one embodiment, as shown in FIG. 27, FIG. 27 shows a three-dimensional element layout visualization apparatus according to an embodiment, including: a bounding box determination module 11, an edge element determination module 12 and a collinearity identification determination module 13. The bounding box determination module 11 is configured to determine a bounding box of each three-dimensional element in a visualization interface, the bounding box of each three-dimensional element is a frame of a preset shape in the visualization interface and capable of accommodating each three-dimensional element, and the frame of the preset shape is a frame with a regular shape and straight edges. The edge element determination module 12 is configured to project the bounding box of each three-dimensional element in a target projection direction to obtain edge elements of the bounding box of each three-dimensional element in the visualization interface. The collinearity identification determination module 13 is configured to determine, according to positions of the edge elements in the visualization interface, at least one edge element set satisfying a first preset condition, and display a collinearity identification corresponding to the edge element set in the visualization interface, the collinearity identification is configured to represent that edge elements in a same edge element set are collinear, and the first preset condition includes belonging to different three-dimensional elements and a distance from a corresponding fitting line being less than a distance threshold.

In one embodiment, the apparatus further includes: a collinearity setting instruction module configured to receive a collinearity setting instruction inputted in the visualization interface by a user, the collinearity setting instruction being configured to indicate that first and second edge elements in the visualization interface are collinear; and a first preset condition updating module configured to update the first preset condition according to the collinearity setting instruction to obtain an updated first preset condition, the updated first preset condition further including the first and second edge elements belonging to a same edge element set; and the collinearity identification determination module 13 includes a first edge element set determination unit configured to determine, according to the positions of the edge elements in the visualization interface, at least one edge element set satisfying the updated first preset condition.

In one embodiment, the apparatus further includes: a collinearity cancellation instruction module configured to receive a collinearity cancellation instruction inputted in the visualization interface by the user, the collinearity cancellation instruction being configured to indicate that third and fourth edge elements in the edge element set are not collinear; and a first preset condition updating module configured to update the first preset condition according to the collinearity cancellation instruction to obtain an updated first preset condition, the updated first preset condition further including the third and fourth edge elements not belonging to a same edge element set; and the collinearity identification determination module 13 includes a second edge element set determination unit configured to determine, according to the positions of the edge elements in the visualization interface, at least one edge element set satisfying the updated first preset condition, and display the collinearity identification corresponding to the edge element set in the visualization interface.

In one embodiment, the collinearity identification determination module 13 includes: a first group unit configured to determine, according to angles between the edge elements and a preset direction and a first mapping relationship, first groups matching the edge elements, the first mapping relationship including a correspondence between different angle ranges and the first groups, and the angles between the edge elements and the preset direction in the first group including at least one different angle; a second group unit configured to determine, according to the angles between the edge elements and the preset direction and a second mapping relationship, second groups matching the edge elements, the mapping relationship including a correspondence between different angles and the second groups, and the angles between the edge elements and the preset direction in the second group being identical; and an edge element set determination unit configured to determine, in the first groups and the second groups, edge element sets satisfying the first preset condition.

In one embodiment, the edge element set determination unit further includes: a fitting line determination subunit configured to fit a plurality of discrete points of the edge elements in each first group to obtain at least one fitting line of the first group, one fitting line in each first group corresponding to at least two edge elements in the first group; and an edge element set determination subunit configured to determine, according to a distance between center points of the edge elements in each first group and the corresponding fitting line, an edge element set in the first group satisfying the first preset condition.

In one embodiment, the edge element set determination unit further includes: a clustering result determination subunit configured to cluster center points of the edge elements in each second group to obtain clustering results of the second group; a fitting line determination subunit configured to fit center points in the clustering results of each second group to obtain at least one fitting line of the second group, one fitting line in each second group corresponding to at least two edge elements in the second group; and an edge element set determination subunit configured to determine, according to a distance between center points of the edge elements in each second group and the corresponding fitting line, an edge element set in the second group satisfying the first preset condition.

In one embodiment, the apparatus further includes: a weight determination module configured to determine a weight of each edge element according to a length of the edge element; a first fitting line determination submodule configured to fit the plurality of discrete points of the edge elements in each first group according to the weights of the edge elements to obtain the at least one fitting line of the first group; and a second fitting line determination submodule configured to fit the center points in the clustering results of each second group according to the weights of the edge elements to obtain the at least one fitting line of the second group.

In one embodiment, the apparatus further includes: a collinearity optimization instruction module configured to receive a collinearity optimization instruction inputted in the visualization interface by the user, the collinearity optimization instruction being configured to indicate optimizing a collinearity relationship between the three-dimensional elements according to the collinearity identification; and an adjustment module configured to move and/or zoom the three-dimensional elements in the visualization interface according to the collinearity optimization instruction to enable the edge elements in each edge element set to be collinear.

In one embodiment, the apparatus further includes: an equidistance relationship determination module configured to determine, according to a distance between two edge elements in an edge element pair of the edge element set, at least one edge element pair set satisfying a second preset condition, the edge element pair being a pair of edge elements composed of adjacent edge elements; the second preset condition including a distance difference being less than a difference threshold; and an equidistance identification determination module configured to display an equidistance identification corresponding to the edge element pair set in the visualization interface, the equidistance identification being configured to represent that distances between edge element pairs in a same edge element pair set are equal.

In one embodiment, the apparatus further includes: an equidistance setting instruction module configured to receive an equidistance setting instruction inputted in the visualization interface by a user; the equidistance setting instruction being configured to indicate that, in the visualization interface, a distance between two edge elements in a first edge element pair and a distance between two edge elements in a second edge element pair are equal; a second preset condition updating module configured to update the second preset condition according to the equidistance setting instruction to obtain an updated second preset condition, the updated second preset condition further including the first and second edge element pairs belonging to a same edge element pair set; and the equidistance relationship determination module being further configured to determine, according to the distance between the two edge elements in the edge element pair of the edge element set, at least one edge element pair set satisfying the updated second preset condition.

In one embodiment, the apparatus further includes: an equidistance cancellation instruction module configured to receive an equidistance cancellation instruction inputted in the visualization interface by the user, the equidistance cancellation instruction being configured to indicate that in a same edge element pair set, a distance between a third edge element pair and a distance between a fourth edge element pair are not equal; a second preset condition updating module configured to update the second preset condition according to the equidistance cancellation instruction to obtain an updated second preset condition, the updated second preset condition further including the third and fourth edge element pairs not belonging to a same edge element pair set; and the equidistance identification determination module being further configured to determine, according to the distance between the two edge elements in the edge element pair of the edge element set, at least one edge element pair set satisfying the updated second preset condition, and update the visualization interface to display an equidistance identification corresponding to the edge element pair set satisfying the updated second preset condition.

In one embodiment, the apparatus further includes: a spacing optimization instruction module configured to receive a spacing optimization instruction inputted in the visualization interface by the user, the spacing optimization instruction being configured to indicate optimizing a spacing relationship between the three-dimensional elements according to the equidistance identification; and a spacing adjustment module configured to move the three-dimensional elements in the visualization interface according to the equidistance optimization instruction, to enable spacing between edge element pairs in the edge element pair set to be equal. Specific limitations on the three-dimensional element layout visualization apparatus can be obtained with reference to the limitations on the three-dimensional element layout visualization method hereinabove, and are not described in detail herein. Each module in the three-dimensional element layout visualization apparatus may be entirely or partially implemented by using software, hardware, or a combination thereof. The above modules may be built in or independent of a processor of a computer device in a hardware form, or may be stored in a memory of the computer device in a software form, so that the processor invokes and performs an operation corresponding to each of the above modules.

In one embodiment, a computer device is provided, including a memory and a processor, the memory storing a computer program, and when the processor executes the computer program, all the contents in the above method embodiment being implemented, for example, the following steps: determining a bounding box of each three-dimensional element in a visualization interface, the bounding box of each three-dimensional element being a frame of a preset shape in the visualization interface and capable of accommodating each three-dimensional element, and the frame of the preset shape being a frame with a regular shape and straight edges; projecting the bounding box of each three-dimensional element in a target projection direction to obtain edge elements of the bounding box of each three-dimensional element in the visualization interface; and determining, according to positions of the edge elements in the visualization interface, at least one edge element set satisfying a first preset condition, and displaying a collinearity identification corresponding to the edge element set in the visualization interface, the collinearity identification being configured to represent that edge elements in a same edge element set are collinear, and the first preset condition including belonging to different three-dimensional elements and a distance from a corresponding fitting line being less than a distance threshold. The implementation principle and technical effect of the computer-readable storage medium according to the above embodiment are similar to those in the above method embodiment, and are not described in detail herein.

In one embodiment, a computer-readable storage medium is provided, having a computer program stored thereon, and the computer program, when executed by a processor, implementing all the contents in the above method embodiment, for example, the following steps: determining a bounding box of each three-dimensional element in a visualization interface, the bounding box of each three-dimensional element being a frame of a preset shape in the visualization interface and capable of accommodating each three-dimensional element, and the frame of the preset shape being a frame with a regular shape and straight edges; projecting the bounding box of each three-dimensional element in a target projection direction to obtain edge elements of the bounding box of each three-dimensional element in the visualization interface; and determining, according to positions of the edge elements in the visualization interface, at least one edge element set satisfying a first preset condition, and displaying a collinearity identification corresponding to the edge element set in the visualization interface, the collinearity identification being configured to represent that edge elements in a same edge element set are collinear, and the first preset condition including belonging to different three-dimensional elements and a distance from a corresponding fitting line being less than a distance threshold.

The implementation principle and technical effect of the computer-readable storage medium according to the above embodiment are similar to those in the above method embodiment, and are not described in detail herein. Those of ordinary skill in the art may understand that all or some procedures in the methods in the foregoing embodiments may be implemented by a computer-readable instruction instructing related hardware, the computer program may be stored in a non-transitory computer-readable storage medium, and when the computer program is executed, the procedures in the foregoing method embodiments may be implemented. Any reference to a memory, a storage, a database, or other media used in the embodiments according to the present disclosure may include a non-transitory and/or transitory memory. The non-transitory memory may include a read-only memory (ROM), a programmable ROM (PROM), an electrically programmable ROM (EPROM), an electrically erasable programmable ROM (EEPROM) or a flash memory. The transitory memory may include a random access memory (RAM) or an external high-speed cache memory. By way of illustration instead of limitation, the RAM is available in a variety of forms, such as a static RAM (SRAM), a dynamic RAM (DRAM), a synchronous DRAM (SDRAM), a dual data rate SDRAM (DDRSDRAM), an enhanced SDRAM (ESDRAM), a synchronization link (Synchlink) DRAM (SLDRAM), a memory Bus (Rambus) direct RAM (RDRAM), a direct memory bus dynamic RAM (DRDRAM), a memory bus dynamic RAM (RDRAM) and the like.

The technical features in the above embodiments may be randomly combined. For concise description, not all possible combinations of the technical features in the above embodiments are described. However, all the combinations of the technical features are to be considered as falling within the scope described in this specification provided that they do not conflict with each other. The above embodiments only describe several implementations of the present disclosure, which are described specifically and in detail, and therefore cannot be construed as a limitation on the patent scope of the present disclosure. It should be pointed out that those of ordinary skill in the art may also make several changes and improvements without departing from the ideas of the present disclosure, all of which fall within the protection scope of the present disclosure. Therefore, the patent protection scope of the present disclosure shall be subject to the appended claims.

The invention claimed is:

1. A three-dimensional element layout visualization method, comprising:

determining a bounding box of each three-dimensional element in a visualization interface, the bounding box of each three-dimensional element being a frame of a preset shape in the visualization interface and capable of accommodating each three-dimensional element, and the frame of the preset shape being a frame with a regular shape and straight edges;

projecting the bounding box of each three-dimensional element in a target projection direction to obtain edge elements of the bounding box of each three-dimensional element in the visualization interface;

determining, according to positions of the edge elements in the visualization interface, at least one edge element set satisfying a first preset condition, and displaying a collinearity identification corresponding to the edge element set in the visualization interface, the collinearity identification being configured to represent that edge elements in a same edge element set are collinear, and the first preset condition comprising belonging to different three-dimensional elements and a distance from a corresponding fitting line being less than a distance threshold;

receiving a collinearity setting instruction inputted in the visualization interface by a user, the collinearity setting instruction being configured to indicate that a first edge element and a second edge element in the visualization interface are collinear; and updating the first preset condition according to the collinearity setting instruction to obtain an updated first preset condition, the updated first preset condition further comprising the first edge element and the second edge element belonging to a same edge element set;

the step of determining, according to positions of the edge elements in the visualization interface, at least one edge element set satisfying a first preset condition comprises: determining, according to the positions of the edge elements in the visualization interface, at least one edge element set satisfying the updated first preset condition; and/or the method further comprises: after the step of displaying a collinearity identification corresponding to the edge element set in the visualization interface, receiving a collinearity cancellation instruction inputted in the visualization interface by the user, the collinearity cancellation instruction being configured to indicate that a third edge element and a fourth edge element in the edge element set are not collinear;

updating the first preset condition according to the collinearity cancellation instruction to obtain an updated first preset condition, the updated first preset condition further comprising the third edge element and the fourth edge element not belonging to a same edge element set; and determining, according to the positions of the edge elements in the visualization interface, at least one edge element set satisfying the updated first preset condition, and displaying the collinearity identification corresponding to the edge element set in the visualization interface.

2. The method according to claim 1, wherein the step of determining, according to positions of the edge elements in the visualization interface, at least one edge element set satisfying a first preset condition comprises:

determining, according to angles between the edge elements and a preset direction and a first mapping relationship, first groups matching the edge elements, the first mapping relationship comprising a correspondence between different angle ranges and the first groups, and the angles between the edge elements and the preset direction in the first group comprising at least one different angle;

determining, according to the angles between the edge elements and the preset direction and a second mapping relationship, second groups matching the edge elements, the mapping relationship comprising a correspondence between different angles and the second groups, and the angles between the edge elements and the preset direction in the second group being identical; and determining, in the first groups and the second groups, edge element sets satisfying the first preset condition.

3. The method according to claim 2, wherein the step of determining, in the first groups and the second groups, edge element sets satisfying the first preset condition comprises:

fitting a plurality of discrete points of the edge elements in each first group to obtain at least one fitting line of the first group, one fitting line in each first group corresponding to at least two edge elements in the first group;

determining, according to a distance between center points of the edge elements in each first group and the corresponding fitting line, an edge element set in the first group satisfying the first preset condition; and/or clustering center points of the edge elements in each second group to obtain clustering results of the second group;

fitting center points in the clustering results of each second group to obtain at least one fitting line of the second group, one fitting line in each second group corresponding to at least two edge elements in the second group; and determining, according to a distance between center points of the edge elements in each second group and the corresponding fitting line, an edge element set in the second group satisfying the first preset condition.

4. The method according to claim 3, further comprising:

determining a weight of each edge element according to a length of the edge element;

the step of fitting a plurality of discrete points of the edge elements in each first group to obtain at least one fitting line of the first group comprises: fitting the plurality of discrete points of the edge elements in each first group according to the weights of the edge elements to obtain the at least one fitting line of the first group; and the step of fitting center points in the clustering results of each second group to obtain at least one fitting line of the second group comprises: fitting the center points in the clustering results of each second group according to the weights of the edge elements to obtain the at least one fitting line of the second group.

5. The method according to claim 1, further comprising:

after the step of displaying a collinearity identification corresponding to the edge element set in the visualization interface, receiving a collinearity optimization instruction inputted in the visualization interface by the user, the collinearity optimization instruction being configured to indicate optimizing a collinearity relationship between the three-dimensional elements according to the collinearity identification; and moving and/or zooming the three-dimensional elements in the visualization interface according to the collinearity optimization instruction to enable the edge elements in each edge element set to be collinear.

6. The method according to claim 1, further comprising:

determining, according to a distance between two edge elements in an edge element pair of the edge element set, at least one edge element pair set satisfying a second preset condition, the edge element pair being a pair of edge elements composed of adjacent edge elements; the second preset condition comprising a distance difference being less than a difference threshold; and displaying an equidistance identification corresponding to the edge element pair set in the visualization interface, the equidistance identification being configured to represent that distances between edge element pairs in a same edge element pair set are equal.

7. The method according to claim 6, further comprising:

receiving an equidistance setting instruction inputted in the visualization interface by a user; the equidistance setting instruction being configured to indicate that, in the visualization interface, a distance between two edge elements in a first edge element pair and a distance between two edge elements in a second edge element pair are equal; and updating the second preset condition according to the equidistance setting instruction to obtain an updated second preset condition, the updated second preset condition further comprising the first edge element pair and the second edge element pair belonging to a same edge element pair set;

the step of determining, according to a distance between two edge elements in an edge element pair of the edge element set, at least one edge element pair set satisfying a second preset condition comprises: determining, according to the distance between the two edge elements in the edge element pair of the edge element set, at least one edge element pair set satisfying the updated second preset condition; and/or the method further comprises: after the step of displaying an equidistance identification corresponding to the edge element pair set in the visualization interface, receiving an equidistance cancellation instruction inputted in the visualization interface by the user, the equidistance cancellation instruction being configured to indicate that in a same edge element pair set, a distance between a third edge element pair and a distance between a fourth edge element pair are not equal;

updating the second preset condition according to the equidistance cancellation instruction to obtain an updated second preset condition, the updated second preset condition further comprising the third edge element pair and the fourth edge element pair not belonging to a same edge element pair set;

determining, according to the distance between the two edge elements in the edge element pair of the edge element set, at least one edge element pair set satisfying the updated second preset condition, and updating the visualization interface to display an equidistance identification corresponding to the edge element pair set satisfying the updated second preset condition.

8. The method according to claim 7, further comprising: after the step of displaying an equidistance identification corresponding to the edge element pair set in the visualization interface, receiving a spacing optimization instruction inputted in the visualization interface by the user, the spacing optimization instruction being configured to indicate optimizing a spacing relationship between the three-dimensional elements according to the equidistance identification; and moving the three-dimensional elements in the visualization interface according to the spacing optimization instruction, to enable spacing between edge element pairs in the edge element pair set to be equal.

9. The method according to claim 6, further comprising: after the step of displaying an equidistance identification corresponding to the edge element pair set in the visualization interface, receiving a spacing optimization instruction inputted in the visualization interface by the user, the spacing optimization instruction being configured to indicate optimizing a spacing relationship between the three-dimensional elements according to the equidistance identification; and moving the three-dimensional elements in the visualization interface according to the spacing optimization instruction, to enable spacing between edge element pairs in the edge element pair set to be equal.

10. A three-dimensional element layout visualization apparatus, comprising:

a bounding box determination module configured to determine a bounding box of each three-dimensional element in a visualization interface, the bounding box of each three-dimensional element being a frame of a preset shape in the visualization interface and capable of accommodating each three-dimensional element, and the frame of the preset shape being a frame with a regular shape and straight edges;

an edge element determination module configured to project the bounding box of each three-dimensional element in a target projection direction to obtain edge elements of the bounding box of each three-dimensional element in the visualization interface; and a collinearity identification determination module configured to determine, according to positions of the edge elements in the visualization interface, at least one edge element set satisfying a first preset condition, and display a collinearity identification corresponding to the edge element set in the visualization interface, the collinearity identification being configured to represent that edge elements in a same edge element set are collinear, and the first preset condition comprising belonging to different three-dimensional elements and a distance from a corresponding fitting line being less than a distance threshold;

a collinearity setting instruction module configured to receive a collinearity setting instruction inputted in the visualization interface by a user, the collinearity setting instruction being configured to indicate that a first edge element and a second edge element in the visualization interface are collinear; and a first preset condition updating module configured to update the first preset condition according to the collinearity setting instruction to obtain an updated first preset condition, the updated first preset condition further comprising the first edge element and the second edge element belonging to a same edge element set;

the collinearity identification determination module comprises a first edge element set determination unit configured to determine, according to the positions of the edge elements in the visualization interface, at least one edge element set satisfying the updated first preset condition; and/or the apparatus further comprises:

a collinearity cancellation instruction module configured to receive a collinearity cancellation instruction inputted in the visualization interface by the user, the collinearity cancellation instruction being configured to indicate that a third edge element and a fourth edge element in the edge element set are not collinear;

a first preset condition updating module configured to update the first preset condition according to the collinearity cancellation instruction to obtain an updated first preset condition, the updated first preset condition further comprising the third edge element and the fourth edge element not belonging to a same edge element set; and the collinearity identification determination module comprises a second edge element set determination unit configured to determine, according to the positions of the edge elements in the visualization interface, at least one edge element set satisfying the updated first preset condition, and display the collinearity identification corresponding to the edge element set in the visualization interface.

* * * * *